(12) United States Patent
Chen et al.

(10) Patent No.: US 10,899,871 B2
(45) Date of Patent: Jan. 26, 2021

(54) PHOSPHOROUS CONTAINING EPOXY RESINS AND PROCESS FOR SYNTHESIS

(71) Applicant: CHANG CHUN PLASTICS CO., LTD., Taipei (TW)

(72) Inventors: Szu-Fang Chen, Taipei (TW); Sung-Kuang Chung, Taipei (TW); An-Pang Tu, Taipei (TW); Gai-Chi Chen, Taipei (TW); Zhao-Ming Chen, Taipei (TW); Kuen-Yuan Hwang, Taipei (TW)

(73) Assignee: CHANG CHUN PLASTICS CO., LTD., Taipei (TW)

( * ) Notice: Subject to any disclaimer, the term of this patent is extended or adjusted under 35 U.S.C. 154(b) by 58 days.

(21) Appl. No.: 16/391,441

(22) Filed: Apr. 23, 2019

(65) Prior Publication Data

US 2020/0339736 A1 Oct. 29, 2020

(51) Int. Cl.
| | |
|---|---|
| *C08G 59/30* | (2006.01) |
| *C08G 59/22* | (2006.01) |
| *C08G 59/02* | (2006.01) |
| *B32B 27/38* | (2006.01) |
| *B32B 15/092* | (2006.01) |
| *C08L 63/00* | (2006.01) |
| *C08G 59/06* | (2006.01) |
| *C08G 59/40* | (2006.01) |
| *C07F 9/6571* | (2006.01) |
| *C08J 5/24* | (2006.01) |

(52) U.S. Cl.
CPC .......... *C08G 59/063* (2013.01); *B32B 15/092* (2013.01); *B32B 27/38* (2013.01); *C07F 9/657172* (2013.01); *C08G 59/304* (2013.01); *C08G 59/4028* (2013.01); *C08J 5/24* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 6,984,716 B2 | 1/2006 | Hwang et al. | |
| 7,064,157 B2 | 6/2006 | Hwang et al. | |
| 8,134,021 B2 | 3/2012 | Lin et al. | |
| 8,242,266 B2 | 8/2012 | Lin et al. | |
| 8,426,547 B2 | 4/2013 | Su et al. | |
| 9,546,262 B1 | 1/2017 | Tu et al. | |
| 9,605,109 B1 | 3/2017 | Tu et al. | |
| 2014/0121299 A1* | 5/2014 | Feng | C08G 18/003 523/427 |
| 2017/0260321 A1* | 9/2017 | Pan | C08G 59/26 |
| 2018/0016387 A1* | 1/2018 | Xu | C08J 5/24 |
| 2020/0010603 A1* | 1/2020 | Eling | C08G 18/1875 |

FOREIGN PATENT DOCUMENTS

| | | | | |
|---|---|---|---|---|
| CN | 106132974 A | | 11/2016 | |
| JP | 2003012765 A | * | 1/2003 | ............ C08G 59/14 |
| JP | 2016169362 A | * | 9/2016 | ............ C08G 59/26 |
| WO | WO-2016140459 A1 | * | 9/2016 | ............ C07D 303/42 |

OTHER PUBLICATIONS

Machine translation of WO-2016140459-A1 (no date).*
Machine translation of JP-2016169362-A (no date).*
Machine translation of JP-2003012765-A (no date).*

* cited by examiner

*Primary Examiner* — Michael J Feely
(74) *Attorney, Agent, or Firm* — Polsinelli PC

(57) ABSTRACT

The present invention provides epoxy resin compounds comprising a high phosphorus and oxazolidone content, methods to prepare these epoxy resin compounds, curable compositions comprising these epoxy resins, and cured epoxy resin compounds by curing the curable epoxy resin compounds comprising a high phosphorus and oxazolidone content.

20 Claims, 1 Drawing Sheet

PHOSPHOROUS CONTAINING EPOXY RESINS AND PROCESS FOR SYNTHESIS

FIELD OF THE INVENTION

The present disclosure relates to curable phosphorus-containing epoxy resins, cured phosphorus-containing epoxy resins and methods of making the same.

BACKGROUND OF THE INVENTION

Due to their good resistance to solvents, excellent mechanical strength, and electrical insulating properties, epoxy resins are widely used in many fields. For example, epoxy resins are often applied to coating materials, electrical insulating materials, printed circuit board laminates, electronic packaging materials, construction and building materials, and navigation related technology. Epoxy resins, however, can have poor thermal resistance and may burn easily, which may set significant restrictions on their uses. Therefore, the industry has sought to improve the flame retardant properties and the thermal resistance of epoxy resins.

While many techniques are available for improving the flame retardant properties of epoxy resins, the most common is to introduce a flame retardant group into an epoxy resin compound. Often, halogens are introduced into the epoxy resin. These halogens are effective in providing the epoxy resin with flame retardancy but can liberate hydrogen halide gases which are corrosive and toxic.

In addition to the halogen containing compounds, another approach to improve flame retardancy is introducing phosphorus-containing compounds which are highly preferred with respect to efficiency. For example, phosphorus-containing compound 9,10-dihydro-9-oxa-10-phosphaphenanthrene 10-oxide (DOPO) is highly reactive with many organic functional groups within the epoxy resin. DOPO has active hydrogen atoms capable of reacting with electron deficient compounds such as benzoquinone, oxirane, maleic acid, bismaleimide, diaminobenzophenone, and terephthaldicarboxaldehyde, and derivatives thereof. DOPO and derivatives of DOPO have gained wide use in both academic and industrial settings. However, DOPO and DOPO derivatives react with epoxy groups in the resin forms secondary hydroxyl groups in the structure. The resulting phosphorus-containing epoxy resins have difficulties in maintaining high heat resistance and good dielectric properties.

In order to solve this problem, the phosphorus content in traditional phosphorus containing epoxy resins was limited to approximately 2 to 4%. Even at this phosphorus level, difficulties still remain in maintaining both high heat resistance and good dielectric properties. Accordingly, there is a need to develop an isocyanate modified epoxy resin, which is capable of increasing or keeping high phosphorus content, decreasing secondary alcohol formation, and introducing the oxazolidone structure to enhance both the flame retardant properties, heat resistance, and dielectric properties on phosphorus-containing epoxy.

SUMMARY OF THE INVENTION

In one aspect, disclosed herein are compounds of Formula (I):

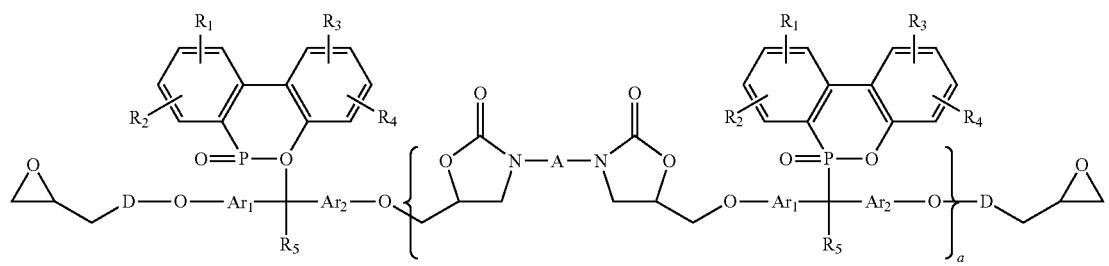

Formula (I)

wherein,

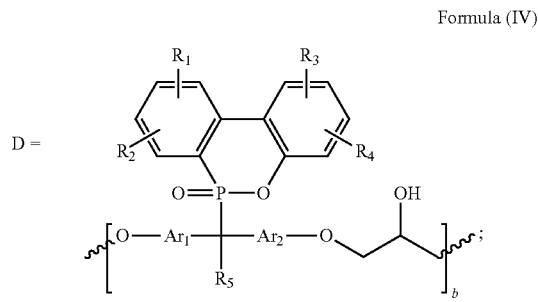

Formula (IV)

$R_1$, $R_2$, $R_3$, and $R_4$ at each occurrence are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

a is an integer between 1 and 5;

b is an integer between 0 and 5;

$R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$;

wherein $Ar_3$ is selected from a group consisting of:

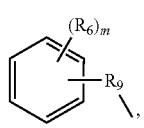

Formula (V)

Formula (VI)
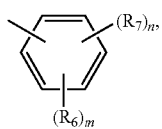
Formula (VIII)
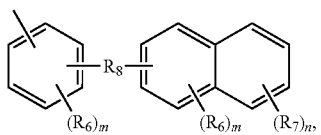
Formula (VIII)
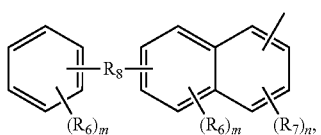
Formula (IX)
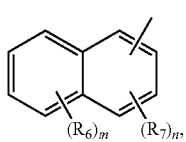
Formula (X)
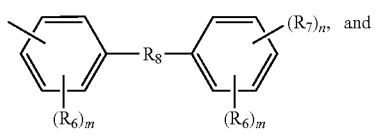, and
Formula (XI)
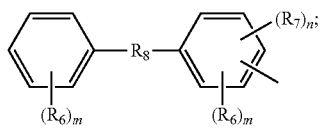;
Ar₁ and Ar₂ are independently selected from the group consisting of:
Formula (XII)
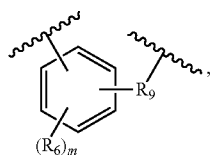,
Formula (XIII)
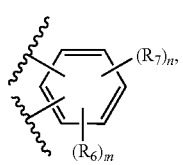,
Formula (XIV)
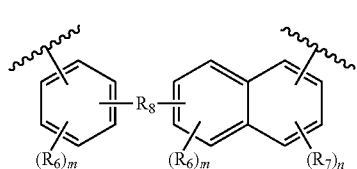
Formula (XV)
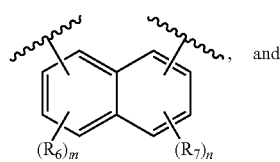, and
Formula (XVI)
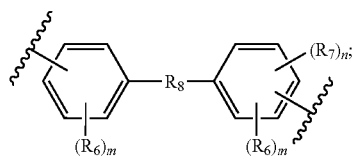;
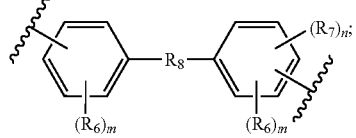
A is selected from the group consisting of:
Formula (XVII)
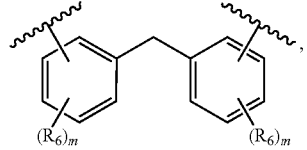
Formula (XVIII)
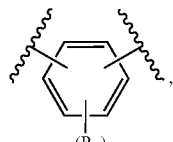,
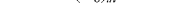
Formula (XIX)
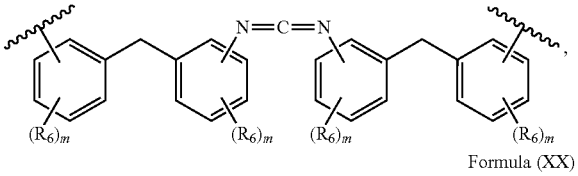
Formula (XX)
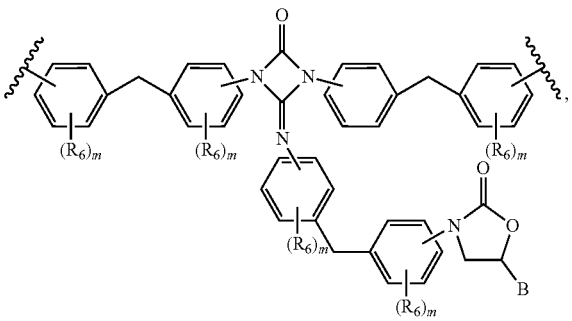
and
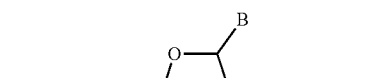
Formula (XXI)
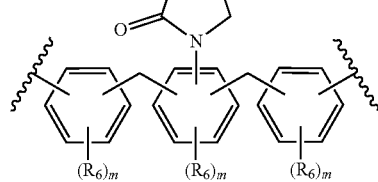

m and n are independent integers from 0 to 4; wherein

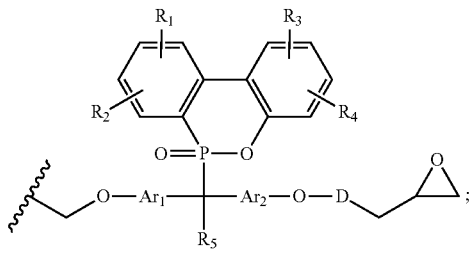

Formula (XXII)

B =

R$_6$ and R$_7$ are independently selected from the group consisting of H, C$_1$-C$_{10}$ unsubstituted alkyl, C$_1$-C$_{10}$ substituted alkyl, C$_1$-C$_{10}$ unsubstituted alkoxy, C$_1$-C$_{10}$ substituted alkoxy, C$_3$-C$_{10}$ unsubstituted cycloalkyl, and C$_3$-C$_{10}$ substituted cycloalkyl;

R$_8$ is absent or is selected from the group consisting of —CH$_2$—, —(CH$_3$)$_2$C—, —CO—, —SO$_2$—, and —O—; and R$_9$ is absent or is —(CH$_2$)$_p$—, wherein p is an integer from 1 to 20.

In another aspect, disclosed herein are methods to prepare the compound of Formula (I). A method of preparing the compound of Formula (I):

and at least one catalyst; wherein

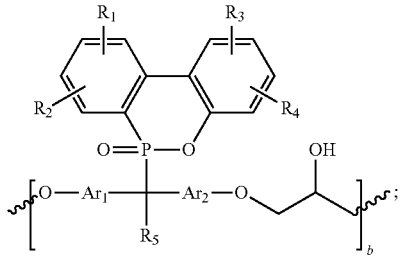

Formula (IV)

D = wherein R$_1$, R$_2$, R$_3$, and R$_4$ at each occurrence are independently selected from the group consisting of H, C$_1$-C$_{10}$ unsubstituted alkyl, C$_1$-C$_{10}$ substituted alkyl, C$_1$-C$_{10}$ unsubstituted alkoxy, C$_1$-C$_{10}$ substituted alkoxy, C$_3$-C$_{1o}$ unsubstituted cycloalkyl, and C$_3$-C$_{10}$ substituted cycloalkyl;

a is an integer between 1 and 5;
b is an integer between 0 and 5;
R$_5$ is independently selected from the group consisting of C$_1$-C$_{10}$ unsubstituted alkyl, C$_1$-C$_{10}$ substituted alkyl, C$_1$-C$_{10}$ unsubstituted alkoxy, C$_1$-C$_{10}$ substituted alkoxy, C$_3$-C$_{10}$ unsubstituted cycloalkyl, and C$_3$-C$_{10}$ substituted cycloalkyl, and Formula (I)

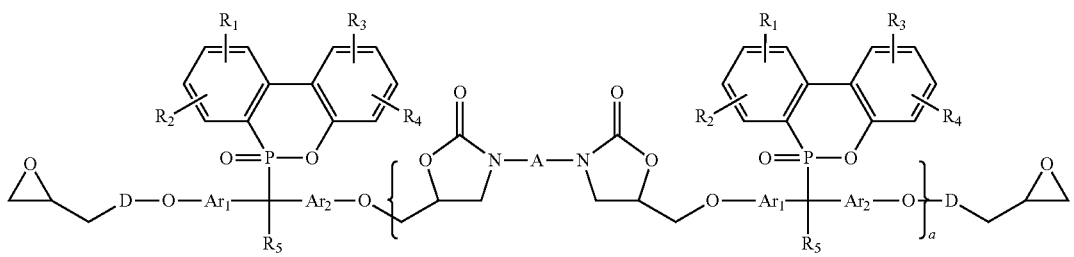

comprising contacting a compound of Formula (II),

Formula (II)

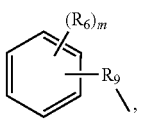

with a compound of Formula (III),

O=C=N—A—N=C=O    Formula (III);

Ar$_3$; wherein Ar$_3$ is selected from a group consisting of:

Formula (V)

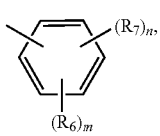

Formula (VI)

Formula (VIII)

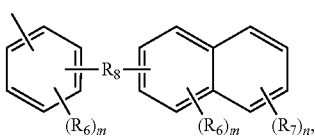

-continued

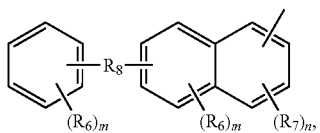

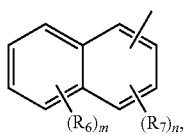

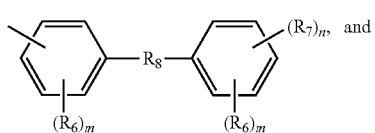 and

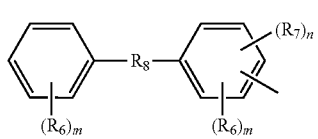

$Ar_1$ and $Ar_2$ are independently selected from the group consisting of:

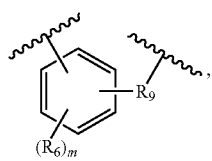

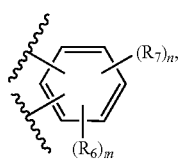

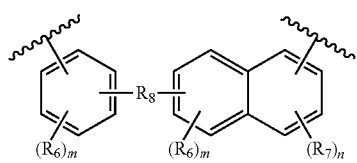

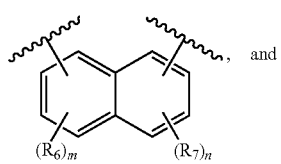 , and

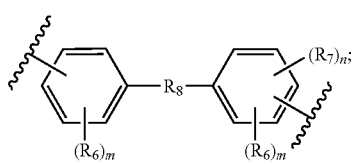 ;

A is selected from the group consisting of:

Formula (IX)

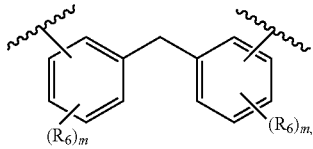

Formula (X)

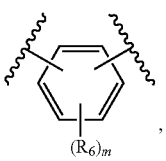 ,

Formula (XI)

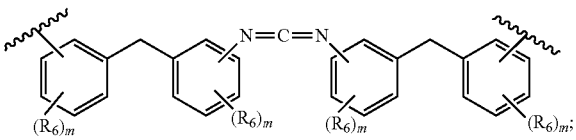 ,

Formula (XII)

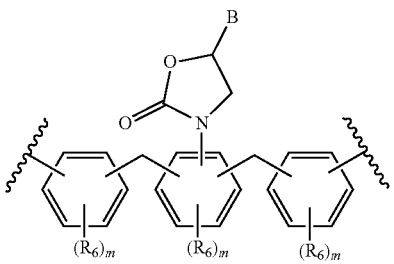 , and

Formula (XIII)

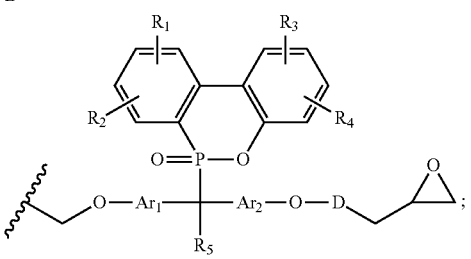

m and n are independent integers from 0 to 4;

Formula (XIV)

$$B = $$

Formula (IX) — Formula (XVII)
Formula (X) — Formula (XVIII)
Formula (XI) — Formula (XIX)
Formula (XII) — Formula (XX)
Formula (XIII) — Formula (XXI)
Formula (XIV) — Formula (XXII)
Formula (XV)
Formula (XVI)

$R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

In another aspect, disclosed herein are curable compositions. The curable composition comprises: (a) at least one compound of Formula (I); (b) at least one hardener; and (c) at least one catalyst.

In still another aspect, disclosed herein are curable compositions. The curable composition comprises: A cured composition prepared by curing the curable composition comprising: (a) at least one compound of claim 1; (b) at least one hardener; (c) at least one catalyst; (d) at least one copper foil, and (e).at least one fiber fabric.

In an additional aspect, disclosed herein are cured compositions which are obtained by curing the curable compositions comprising Formula (I).

Other features and iterations of the invention are described in more detail below.

DETAILED DESCRIPTION OF THE INVENTION

Figure 1:
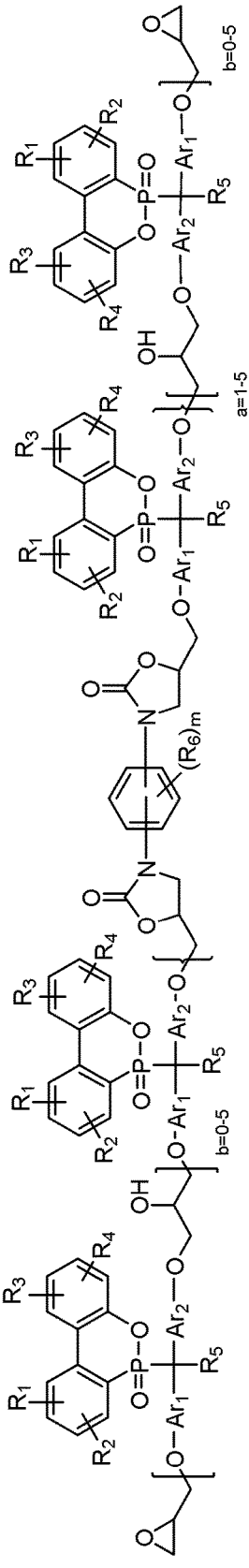
FIG. 1 represents a compound of Formula (I).
Figure 2:
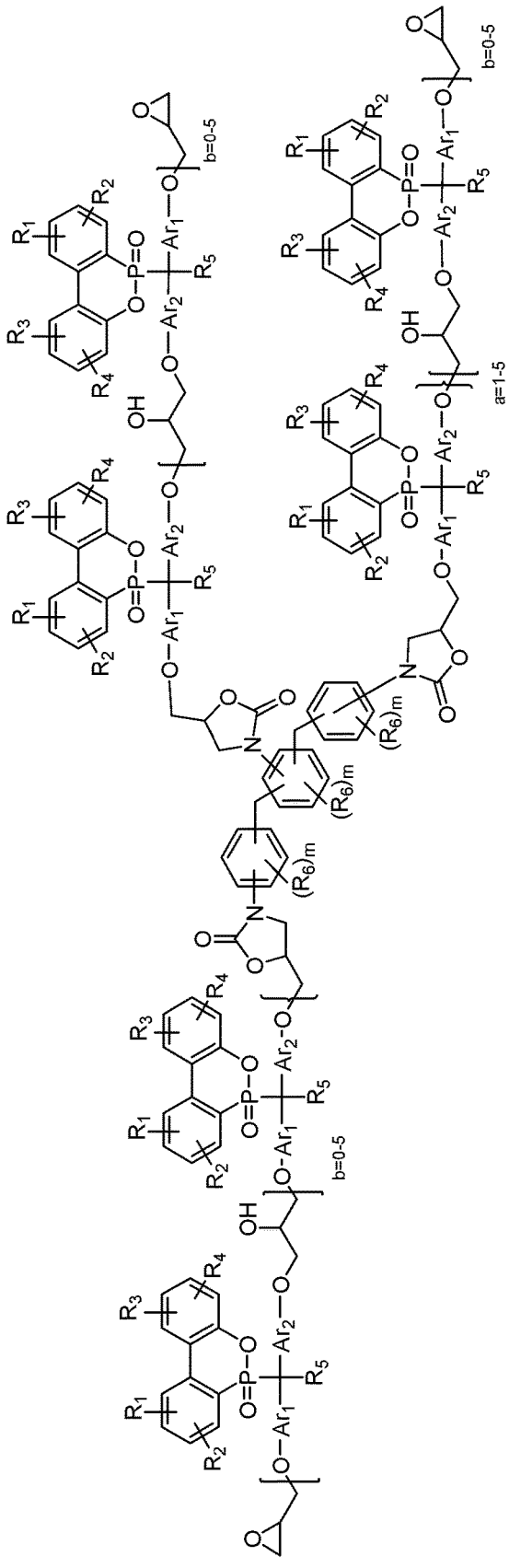
FIG. 2 represents a different compound of Formula (I).

The present disclosure provides compounds of Formula (I), methods to prepare compounds of Formula (I), a curable composition comprising the compound of Formula (I), and curing the curable composition comprising the compound of Formula (I). Generally, these cured compositions have improved properties such as improved flammability resistance, high thermal resistance and dielectric properties.

(I) Compounds Comprising Formula (I)

One aspect of the present disclosure encompasses compounds of Formula (I):

wherein

Formula (IV)

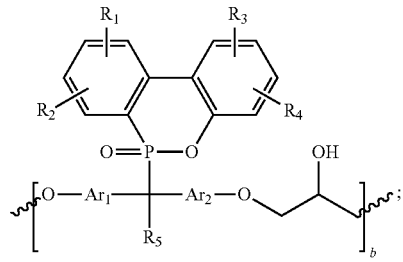

$R_1$, $R_2$, $R_3$, and $R_4$ at each occurrence are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

a is an integer between 1 and 5;

b is an integer between 0 and 5;

$R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

Formula (V)

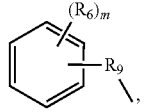

Formula (VI)

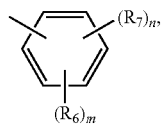

Formula (VIII)

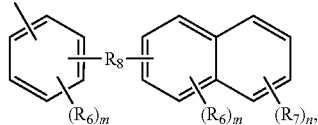

Formula (I)

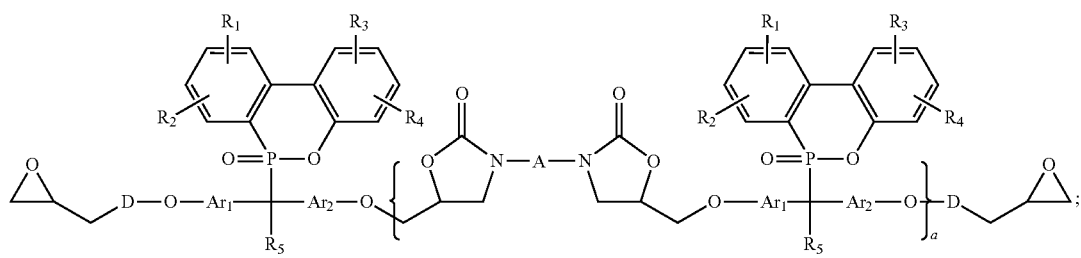

-continued
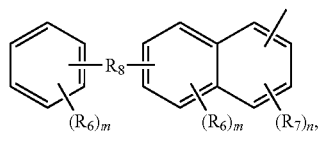
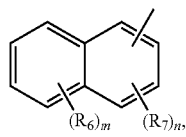
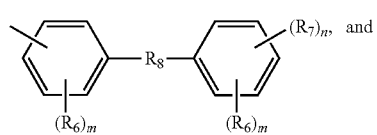
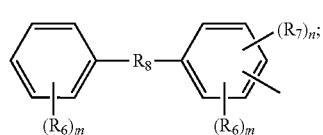
Ar₁ and Ar₂ are independently selected from the group consisting of:
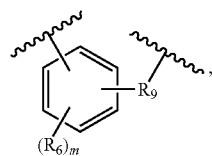
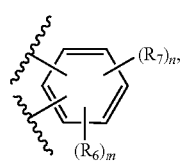
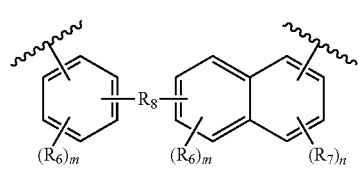
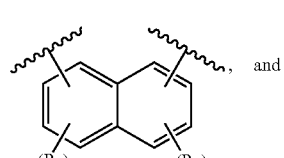
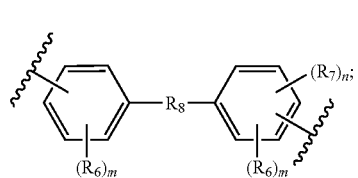
A is selected from the group consisting of:
Formula (XVII)
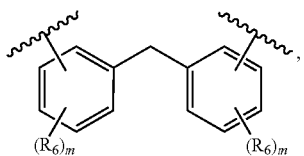
Formula (XVIII)
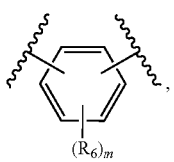
Formula (XIX)
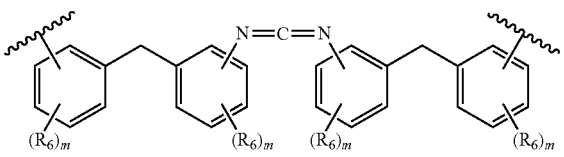
Formula (XX)
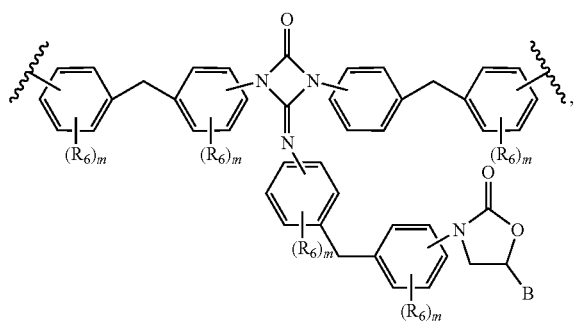
and
Formula (XXI)
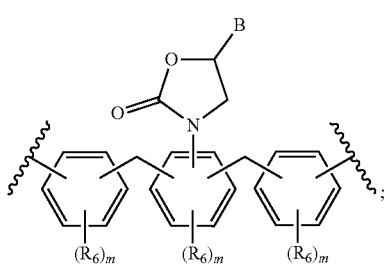
m is an independent integers from 0 to 4;
Formula (XXII)
B =
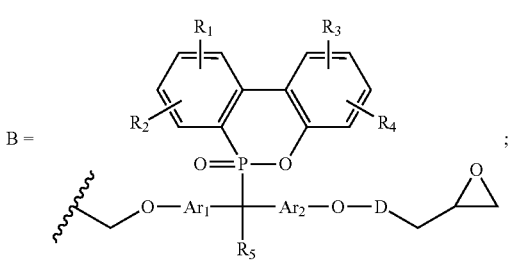

$R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

When combining the above groups, it may be necessary to rotate one or more of them around an axis, such as the vertical axis. For example, before D can be inserted into the right hand portion of Formula (I), it should be rotated 180° around its vertical axis. Otherwise, a peroxide results, which is not desired. Similarly, the D group may be rotated 180° around its vertical axis before it is inserted into the B group.

In general, $R_1$, $R_2$, $R_3$, and $R_4$ at each occurrence are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl. In various embodiments, $R_1$, $R_2$, $R_3$, and $R_4$ at each occurrence are independently selected from the group consisting of hydrogen, $C_1$-$C_4$ unsubstituted alkyl, and $C_1$-$C_4$ substituted alkyl. In some embodiments, $R_1$, $R_2$, $R_3$, and $R_4$ at each occurrence are independently selected from the group consisting of hydrogen, methyl, ethyl, isopropyl, n-propyl, n-butyl, and tert-butyl. In some embodiments, $R_1$, $R_2$, $R_3$, and $R_4$ are hydrogen.

Generally, $R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

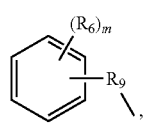

Formula (V)

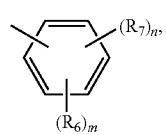

Formula (VI)

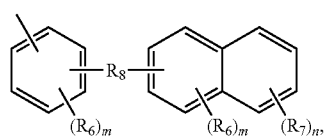

Formula (VIII)

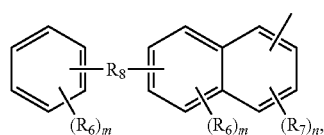

Formula (IX)

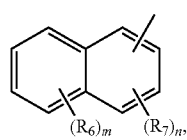

Formula (X)

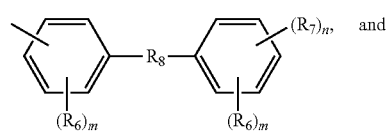

Formula (XI)

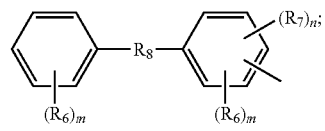

Formula (XII)

wherein $R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl; $R_8$ is absent or is selected from the group consisting of —$CH_2$—, —$(CH_3)_2C$—, —CO—, —$SO_2$—, and —O—; and $R_9$ is absent or is -$(CH_2)_p$—, wherein p is an integer from 1 to 20. In various embodiments, $R_5$ is $C_1$-$C_6$ unsubstituted alkyl or $C_1$-$C_6$ substituted alkyl. In some embodiment, $R_5$ is $C_1$-$C_4$ unsubstituted alkyl. In some embodiments, $R_5$ is methyl.

In general, $Ar_1$ and $Ar_2$ are independently selected from a group consisting of:

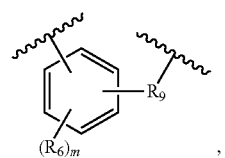

Formula (XII)

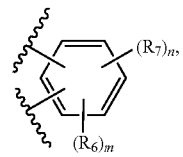

Formula (XIII)

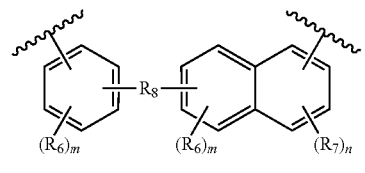

Formula (XIV)

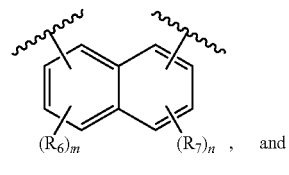

Formula (XV)

, and

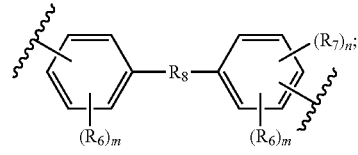

Formula (XVI)

wherein $R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

In various embodiments, $Ar_1$ and $Ar_2$ are independently:

Formula (XII)

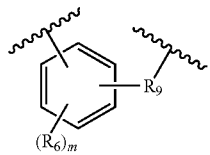

wherein $R_6$ is hydrogen or $C_1$-$C_4$ unsubstituted alkyl and $R_9$ is absent or —$(CH_2)_p$—
wherein p is an integer from 1 to 4.

In some embodiments, $Ar_1$ and $Ar_2$ are independently:

Formula (XII)

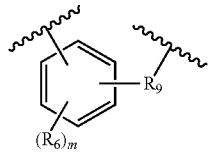

wherein $R_6$ is hydrogen, methyl, or ethyl and $R_9$ is absent or —$(CH_2)_p$— wherein p is an integer from 1 to 2.

In some embodiments, $Ar_1$ and $Ar_2$ are independently:

Formula (XII)

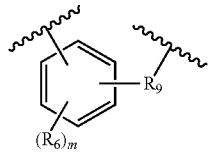

wherein $R_6$ is hydrogen and $R_9$ is absent.

Generally, A is selected from a group consisting of:

Formula (XVII)

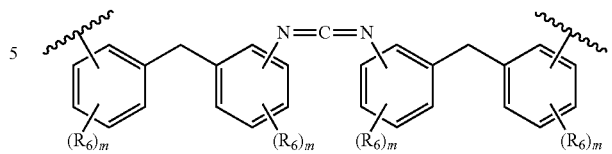

Formula (XVIII)

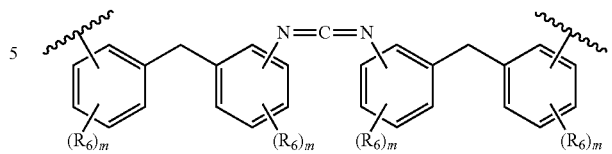

Formula (XIX)

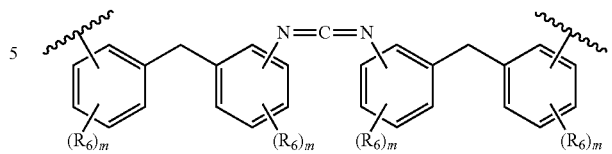

Formula (XX)

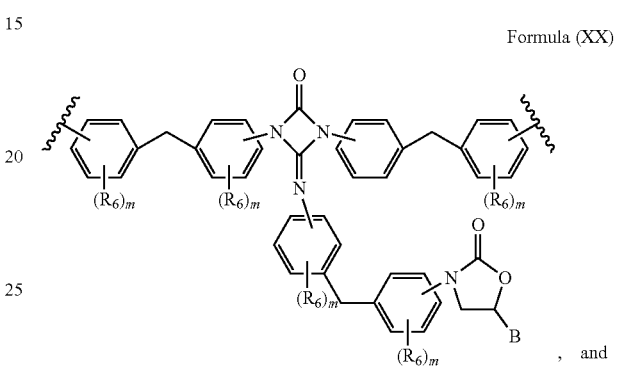

, and

Formula (XXI)

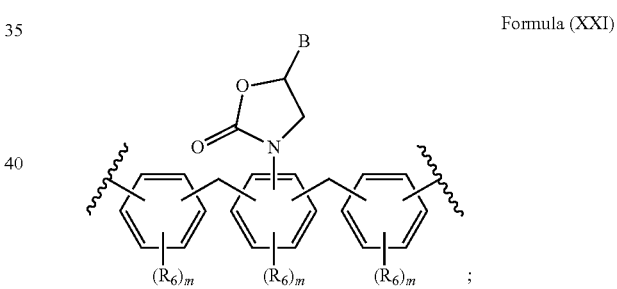

;

wherein m is an independent integer from 0 to 4; and

Formula (XXII)

$$B = \begin{array}{c} \text{structure with } R_1, R_2, R_3, R_4, R_5, Ar_1, Ar_2, D, P=O \end{array}$$

;

$R_6$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl.

In various embodiments, A is selected from a group consisting of:

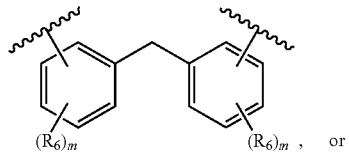

Formula (XVII)

or

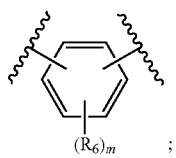

Formula (XVIII)

;

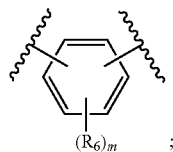

Formula (XVIII)

;

wherein m is an independent integer from 0 to 1, and $R_6$ are independently selected from the group consisting of H, methyl, ethyl, and iso-propyl. In one embodiment, $R_6$ is H.

(II) Processes for Preparing Compounds Having Formula (I)

Another aspect of the present disclosure provides a process to prepare compounds of Formula (I). The process comprises contacting a compound of Formula (II) with a compound of Formula (III) and at least one catalyst according to Reaction Scheme (I).

Reaction Scheme (I)

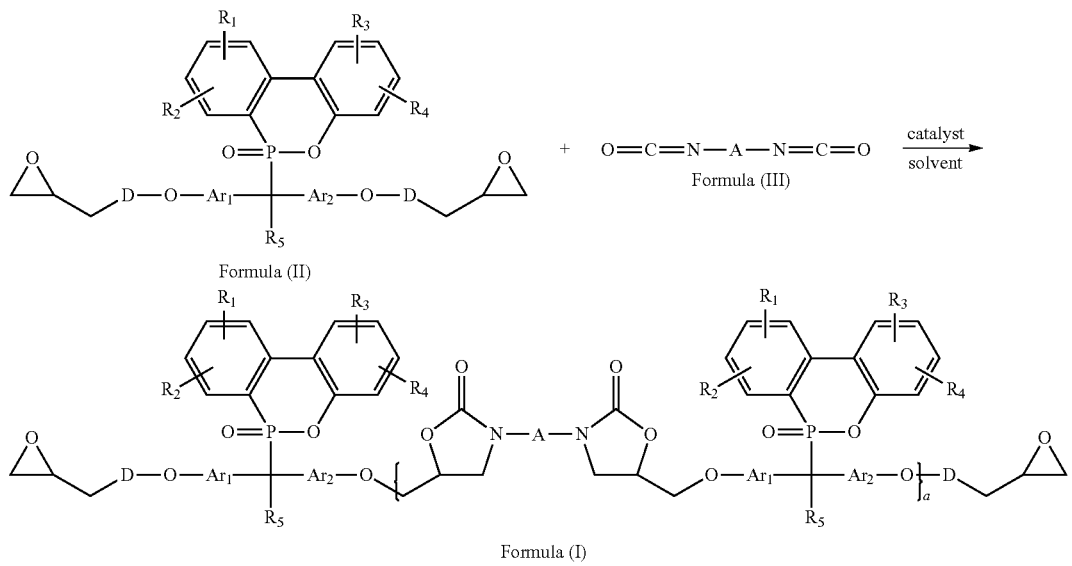

wherein m is an independent integer from 0 to 2; and $R_6$ are independently selected from the group consisting of H, $C_1$-$C_6$ unsubstituted alkyl, and $C_1$-$C_6$ substituted alkyl.

In some embodiments, A is selected from a group consisting of:

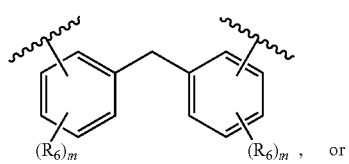

Formula (XVII)

or wherein

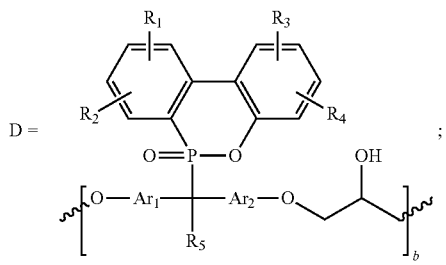

Formula (IV)

;

$R_1$, $R_2$, $R_3$, and $R_4$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

a is an integer between 1 and 5;

b is an integer between 0 and 5;

$R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

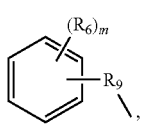

Formula (V)

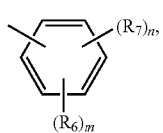

Formula (VI)

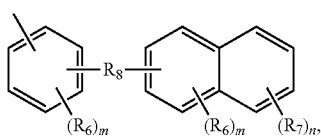

Formula (VIII)

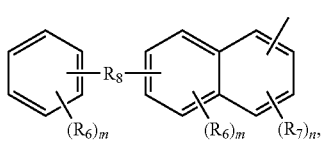

Formula (IX)

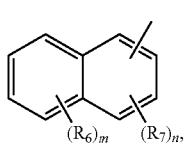

Formula (X)

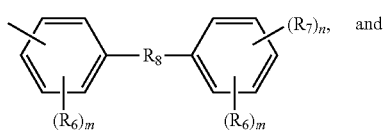

Formula (XI)

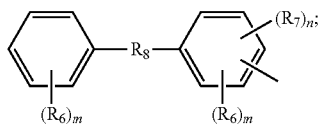

Formula (XII)

$Ar_1$ and $Ar_2$ are independently selected from the group consisting of:

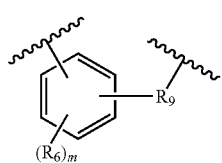

Formula (XII)

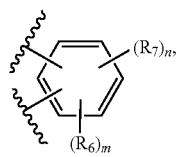

Formula (XIII)

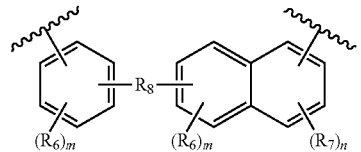

Formula (XIV)

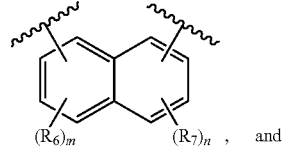

Formula (XV)

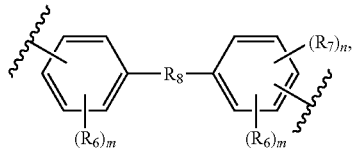

Formula (XVI)

A is selected from the group consisting of:

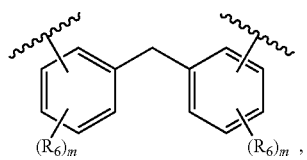

Formula (XVII)

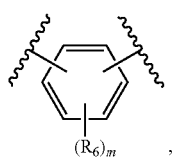

Formula (XVIII)

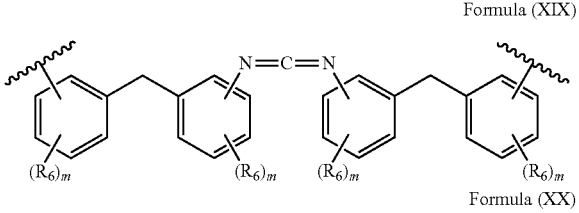

Formula (XIX)

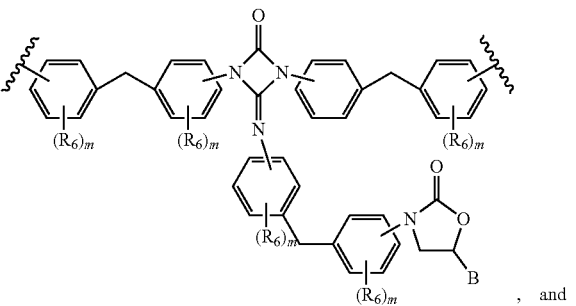

Formula (XX)

, and

-continued

Formula (XXI)

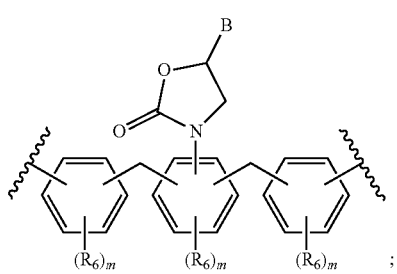

m and n are independent integers from 0 to 4;

Formula (XXII)

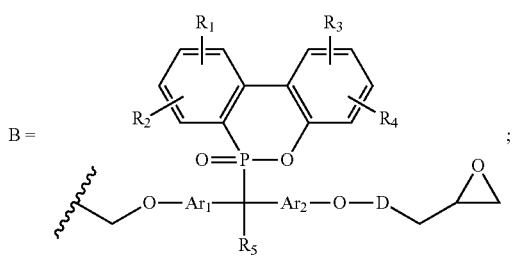

$R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$-, and —O—; and $R_9$ is absent or is —$(CH_2)_p$—, wherein p is an integer from 1 to 20.

In various embodiments, $R_1$, $R_2$, $R_3$, and $R_4$ are independently selected from the group consisting of hydrogen, $C_1$-$C_4$ unsubstituted alkyl, and $C_1$-$C_4$ substituted alkyl. In some embodiments, $R_1$, $R_2$, $R_3$, and $R_4$ are independently selected from the group consisting of hydrogen, methyl, ethyl, isopropyl, n-propyl, n-butyl, and tert-butyl. In some embodiments, $R_1$, $R_2$, $R_3$, and $R_4$ are hydrogen.

Generally, $R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

Formula (V)

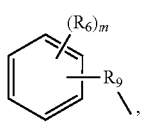

Formula (VI)

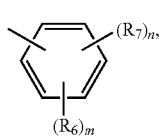

Formula (VIII)

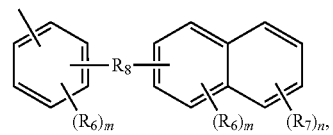

Formula (IX)

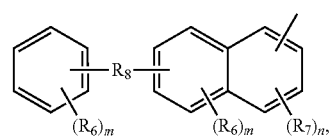

Formula (X)

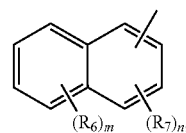

Formula (XI)

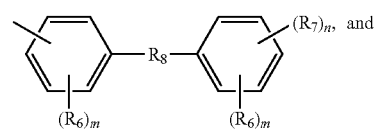

Formula (XII)

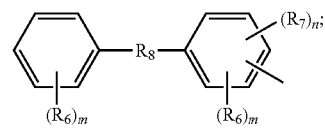

wherein $R_6$ and $R_7$ are independently selected from the group consisting of H, $C_2$-$C_{10}$ unsubstituted alkyl, $C_1$-$C_{10}$ substituted alkyl, $C_1$-$C_{10}$ unsubstituted alkoxy, $C_2$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$≥, and —O—; and $R_9$ is absent or is —$(CH_2)_p$—, wherein p is an integer from 1 to 20.

In various embodiments, $R_5$ is $C_1$-$C_6$ unsubstituted alkyl or $C_1$-$C_6$ substituted alkyl. In some embodiment, $R_5$ is $C_1$-$C_4$ unsubstituted alkyl. In some embodiments, $R_5$ is methyl.

In general, $Ar_1$ and $Ar_2$ are independently selected from a group consisting of:

Formula (XII)

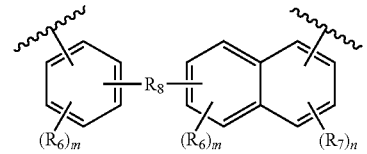

Formula (XIII)

Formula (XIV)

-continued

Formula (XV)

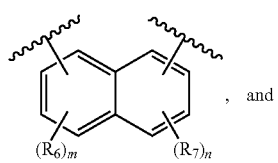
, and

Formula (XVI)

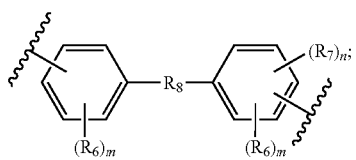

wherein $R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

In various embodiments, $Ar_1$ and $Ar_2$ are independently:

Formula (XII)

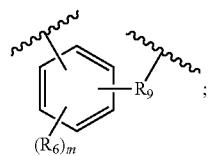

wherein $R_6$ is hydrogen or $C_1$-$C_4$ unsubstituted alkyl and $R_9$ is absent or —$(CH_2)_p$—
wherein p is an integer from 1 to 4.

In some embodiments, $Ar_1$ and $Ar_2$ are independently:

Formula (XII)

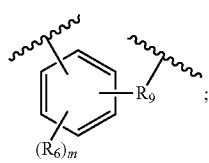

wherein $R_6$ is hydrogen, methyl, or ethyl and $R_9$ is absent or —$(CH_2)_p$— wherein p is an integer from 1 to 2.

In some embodiments, $Ar_1$ and $Ar_2$ are independently:

Formula (XII)

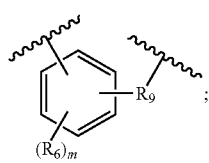

wherein $R_6$ is hydrogen and $R_9$ is absent.

Generally, A is selected from a group consisting of:

Formula (XVII)

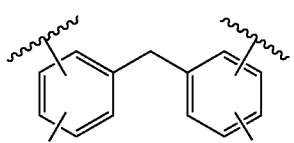

Formula (XVIII)

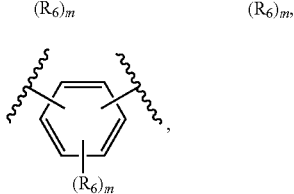
,

Formula (XIX)

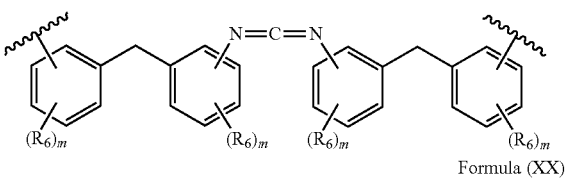

Formula (XX)

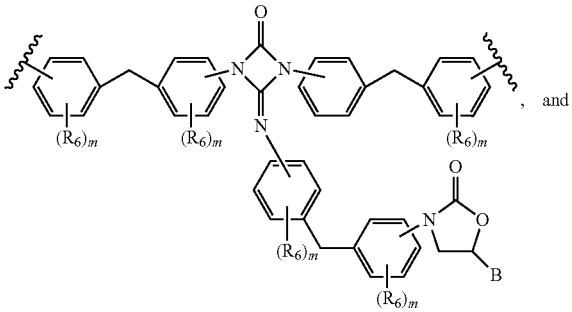
, and

Formula (XXI)

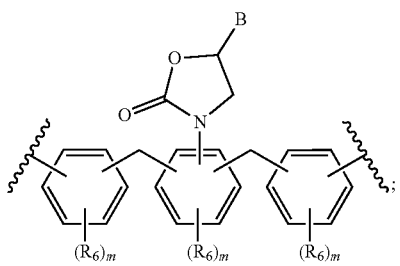
;

wherein m is an independent integer from 0 to 4;

Formula (XXII)

B = 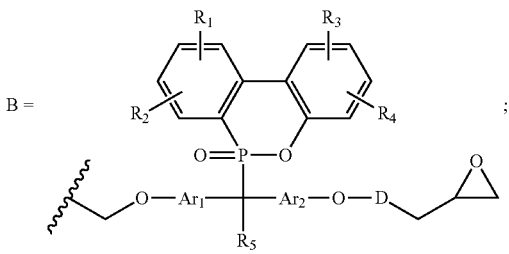
;

wherein $R_6$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl.

In various embodiments, A is selected from a group consisting of:

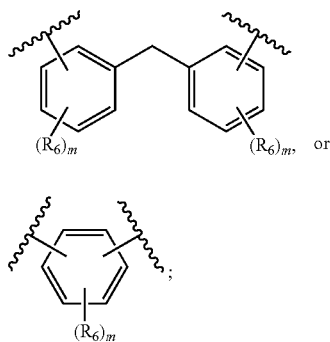

Formula (XVII)

Formula (XVIII)

wherein m is an independent integer from 0 to 2; and $R_6$ is independently selected from the group consisting of H, $C_1$-$C_6$ unsubstituted alkyl, and $C_1$-$C_6$ substituted alkyl. In one embodiment, m is an independent integer from 0 to 1, and $R_6$ are independently selected from the group consisting of H, methyl, ethyl, and iso-propyl. In another embodiment, m is 0 and $R_6$ is H.

(a). Compound of Formula (II)

The phosphorus containing bisphenol compound of Formula (II) is detailed above. In some embodiments, $R_1$, $R_2$, $R_3$, and $R_4$ at each occurrence are independently selected from the group consisting of hydrogen, $C_1$-$C_4$ unsubstituted alkyl, and $C_1$-$C_4$ substituted alkyl. In certain embodiments, $R_1$, $R_2$, $R_3$, and $R_4$ at each occurrence are independently selected from the group consisting of hydrogen, methyl, ethyl, isopropyl, n-propyl, n-butyl, and tert-butyl. In preferred embodiments, $R_1$, $R_2$, $R_3$, and $R_4$ are hydrogen.

In some embodiments, $R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

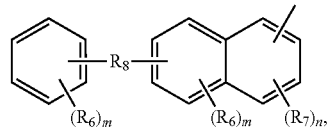

Formula (V)

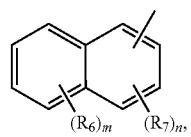

Formula (VI)

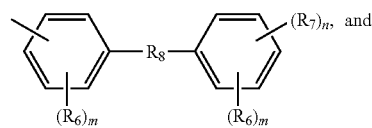

Formula (VIII)

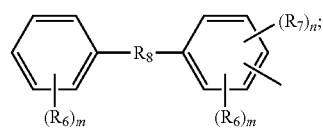

Formula (IX)

Formula (X)

Formula (XI)

Formula (XII)

wherein $R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl; $R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

In various embodiments, $R_5$ is $C_1$-$C_6$ unsubstituted alkyl or $C_1$-$C_6$ substituted alkyl. In some embodiment, $R_5$ is $C_1$-$C_4$ unsubstituted alkyl. In some embodiments, $R_5$ is methyl. The compound may be the phosphorus containing bisphenol epoxy.

(b). Compound of Formula (III)

The diisocyanate compound of Formula (III) is detailed above. In some embodiments, A is selected from a group consisting of:

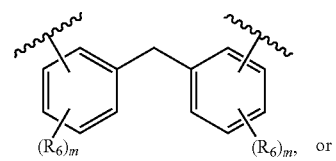

Formula (XVII)

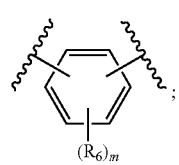

Formula (XVIII)

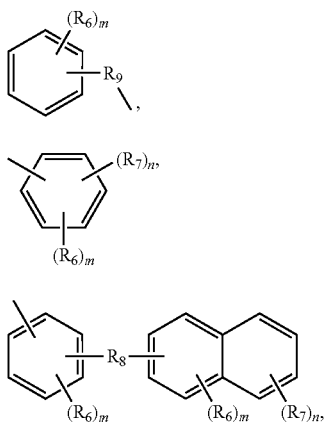

wherein m is an independent integer from 0 to 2; and $R_6$ are independently selected from the group consisting of H, $C_1$-$C_6$ unsubstituted alkyl, or $C_1$-$C_6$ substituted alkyl. In a further embodiment, m is an independent integer from 0 to 1, and $R_6$ is independently selected from the group consisting of H, methyl, ethyl, and iso-propyl. In one embodiment, $R_6$ is independently selected from the group consisting of H and methyl. In a further embodiment, the compound of Formula (III) is methylene diphenyl diisocyanate.

In general, the weight ratio of the compound comprising Formula (II) to the compound comprising Formula (III) may range from about 20.0:1.0 to about 5.0:1.0. In various embodiments, the weight ratio of the compound comprising Formula (II) to the compound comprising Formula (III) may range from about 20.0:1.0 to about 5.0:1.0, from about 18.0:1.0 to about 6.0:1.0, from about 16.0:1.0 to about 8.0:1.0, from about 14.0:1.0 to about 10.0:1.0, or from about 13.0:1.0 to about 11.0:1.0. In one exemplary embodiment, the weight ratio of the compound comprising Formula (II) to the compound comprising Formula (III) may be about 12.5:1.0.

(c) At Least One Catalyst

A wide variety of catalysts may be used in the process. The catalyst, as defined herein, promotes the addition reaction and the phosphorus containing bisphenol compound of Formula (II) with the diisocyanate compound of Formula (III). Non-limiting examples of suitable catalysts may be 2-methyl imidazole (2MI), 2-phenyl imidazole (2PI), 2-ethyl-4-methyl imidazole (2E4MZ), 1-benzyl-2-phenylimidazole (1 B2PZ), boric acid, triphenylphosphine (TPP), tetraphenylphosphonium-tetraphenylborate (TPP-k), a lithium compound, or a combination thereof.

Generally, the weight ratio of the phosphorus containing bisphenol compound of Formula (II) to the catalyst may range from 500:1 to 50:1. In various embodiments, the weight ratio of the phosphorus containing bisphenol compound of Formula (II) to the catalyst may range from 500:1 to about 50:1, from 400:1 to about 100:1, from 350:1 to about 150:1, or from 250:1 to about 175:1. In an exemplary embodiment, the weight ratio of the phosphorus containing bisphenol compound of Formula (II) to the catalyst may be about 200:1.

(d). Optional Solvent

In other embodiments, at least one solvent may be optionally used in the process to prepare the compound of Formula (I). Solvents useful in the process may be selected from, for example, ketones, cyclic ketones, ethers, aromatic hydrocarbons, glycol ethers, and combinations thereof. Non-limiting examples of suitable solvents include n-propyl acetate, n-butyl acetate, xylenes, o-xylenes, m-xylenes, p-xylenes, (mono) propylene glycol (mono) methyl ether (PM), acetone, methyl ethyl ketone, methyl isobutyl ketone, ethyl isobutyl ketone, N-methyl pyrollidone, dimethylformamide, dimethyl sulfoxide, and mixtures thereof. In one preferred embodiment, the at least one solvent useful in the process may be methyl ethyl ketone.

In various embodiments, the at least one solvent may be added to the curable composition to adjust the % solids in the composition.

Generally, the amount of solvent included in the process may range from about 0 weight % to about 70 weight % based on the total weight of the components. In various embodiments, the amount of solvent may be about 0 weight % to 70 weight %, from about 20 weight % to about 60 weight %, or from about 40 weight % to about 50 weight %.

(e). Reaction Conditions

The process to prepare the compound of Formula (I) may be prepared by forming a reaction mixture comprising phosphorus containing bisphenol compound of Formula (II), the diisocyanate compound comprising Formula (III), at least one catalyst, and at least one optional solvent. These components may be added all at the same time, sequentially, or in any order. The curable composition may be achieved by blending the above components in any known mixing equipment or reaction vessel until the mixture achieves homogeneity.

In general, the reaction for preparing the compound of Formula (I) may be conducted at a temperature that ranges from about 90° C. to about 200° C. In various embodiments, the temperature of the reaction may range from about 90° C. to about 190° C., from about 110° C. to about 170° C., or from about 130° C. to about 170° C. The reaction typically is performed under an inert atmosphere, for example, under nitrogen, argon or helium.

The duration of the reaction can and will vary depending on many factors, such as the temperature, the method of mixing, and amount of materials being mixed. The duration of the reaction may range from about 60 minutes to about 5 hours. In some embodiments, the duration of the reaction may range from about 80 minutes to about 4 hours, from about 100 minutes to about 4 hours, from about 2 hours to about 3 hours. In various embodiments, the preparation may be allowed to continue until the reaction appears to be completed.

(f) Properties of the Compound of Formula (I)

In general, the compound of Formula (I) is a solid. For uniformity the compound of Formula (I) disclosed herein may be dissolved in a solvent and adjusted to a high solid content (e.g., at least 60 weight %). In various embodiments, the compound may exhibit a solid content from at least 60 weight %, at least 70 weight %, or greater than 70 weight %.

The compound of Formula (I) disclosed herein may have a phosphorus content of at least 3.5%. In various embodiments, the compound of Formula (I) may have a phosphorus content of at least 3.5%, at least 4.0%, at least 4.5%, at least 5.0%, at least 5.3%, or greater than 5.0%.

In general, the compound of Formula (I) may have an oxazolidone content of at least 0.4 [eq/kg]. In various embodiments, the compound of Formula (I) may have an oxazolidone content of at least 0.4 [eq/kg], at least 0.45 [eq/kg], at least 0.49 [eq/kg], at least 0.5 [eq/kg], or greater than 0.5 [eq/kg].

(III) Curable Compositions

Another aspect of the disclosure provides curable compositions comprising: (a) at least one compound of formula (I); and (b) at least one hardener. The curable composition may further comprise at least one solvent, at least one additive or a combination thereof. In one embodiment, the curable composition may be a liquid. In another embodiment, the curable composition may be a semi-solid or solid. These semi-solid or solid curable compositions may be termed as a "prepreg."

(a) At Least One Compound of Formula (I)

The at least one compound of formula (I) is discussed above in Section (I).

(b) At Least One Hardener

The at least one hardener, component (b), (also referred to as a curing agent or crosslinking agent) is useful in preparing the curable coating composition. Non-limiting examples of suitable hardeners may be an anhydride hardener, an acid hardener, an amine hardener, a pyridine hardener, a Lewis acid, phenolic hardener, an alcohol hardener, an imidazole hardener, sulfur hardeners (thiols and mercaptans), or mixtures thereof. In some embodiments, a Lewis acid may be used in conjunction with the above noted hardeners. In other embodiments, the hardener may be a nucleophilic substance an epoxy- reactive phosphorus compound (H-PRR'), a quaternary ammonium salt with a nucleophilic anion, a quaternary phosphonium salt with a nucleophilic anion, a tertiary arsenium salt with a nucleophilic anion, a boric acid containing compound, and a tertiary sulfonium salt with a nucleophilic anion.

Anhydride hardeners include, but are not limited to, for example, phthalic acid anhydride and derivatives thereof, nadic acid anhydride and derivatives, trimellitic acid anhydride and derivatives, pyromellitic acid anhydride and derivatives thereof, benzophenonetetracarboxylic acid anhydride and derivatives thereof, dodecenylsuccinic acid anhydride and derivatives thereof, poly(ethyloctadecanedioic acid) anhydride and derivatives thereof, hexahydrophthalic anhydride, methyl hexahydrophthalic anhydride, tetrahydrophthalic anhydride, methyl tetrahydrophthalic anhydride, nadic acid anhydride, methyl nadic acid anhydride, and mixtures thereof.

Amine hardeners include, but are not limited to, for example, dicydiamide (DICY), polyamide, phenalkamine; polyester amine; ethylenediamine (EDA); diethylenetriamine (DETA); triethylenetetramine (TETA); trimethyl hexane diamine (TMDA); hexamethylene diamine (HMDA); N-(2-aminoethyl)-1,3-propanediamine (N3-Amine); N,N'-1,2-ethanediylbis-1,3-propanediamine (N4-amine); dipropylene triamine; m-xylylenediamine (mXDA); isophorone diamine (IPDA); diaminodiphenylmethane (DDM); diaminodiphenylsulfone (DDS); 2-Ethyl-6-methyl-aniline (MEA); tris(dimethylaminomethyl)phenol (DMP-30); 1,8-diazabicyclo[5.4.0]undec-7-ene (DBU), and mixtures thereof.

Phenolic hardeners include, but are not limited to phenolic resins obtained from the reaction of phenols or alkyl-substituted phenols with formaldehyde, such as phenol novolaks, cresol novolaks, and resoles.

Alcoholic hardeners may be ethylene glycol, diethylene glycol and higher poly(oxyethylene) glycols, 1,2-propanediol or poly(oxypropylene) glycols, 1,3-propanediol, 1,4-butanediol, poly(oxytetramethylene) glycols, 1,5-pentanediol, 1,6-hexanediol, 2,4,6-hexanetriol, glycerol, 1,1,1-trimethylol-propane, pentaerythritol, sorbitol, as well as from polyepichlorohydrins. They may also be derived from cycloaliphatic alcohols such as 1,4-cyclohexanedimethanol, bis(4-hydroxy-cyclohexyl)methane or 2,2-bis(4-hydroxycyclohexyl)propane, or they contain aromatic nuclei such as N,N-bis(2-hydroxyethyl)aniline or p,p'-bis(2-hydroxyethylamino)diphenyl-methane.

Imidazole hardeners include, but are not limited to, for example, 2-methyl imidazole, 2-ethyl-4-methylimidazole, 2-isopropylimidazole, 1-propylimidazole, 2-heptadecylimidazole, and mixtures thereof.

In another embodiment, the hardener may be a sulfur hardener. Non-limiting examples of sulfur hardeners may be methanedithiol, propanedithiol, cyclohexanedithiol, 2-mercaptoethyl-2,3-dimercapto-succinate, 2,3-dimercapto-1-propanol(2-mercaptoacetate), diethylene glycol bis(2-mercaptoacetate), 1,2-dimercaptopropyl methyl ether, bis(2-mercaptoethyl)ether, trimethylolpropane tris(thioglycolate), pentaerythritol tetra(mercaptopropionate), pentaerythritol tetra(thioglycolate), ethyleneglycol dithioglycolate, trimethylolpropane tris(beta-thiopropionate), tris-mercaptan derivative of tri-glycidyl ether of propoxylated alkane, and dipentaerythritol poly(beta-thiopropionate); aromatic thiols such as di-, tri- or tetra-mercaptobenzene, bis-, tris- or tetrakis(mercaptoalkyl)benzene, dimercaptobiphenyl, toluenedithiol and naphthalenedithiol; heterocyclic ring-containing thiols such as amino-4,6-dithiol-sym-triazine, alkoxy-4,6-dithiol-sym-triazine, aryloxy-4,6-dithiol-sym-triazine and 1,3,5-tris(3-mercaptopropyl) isocyanurate; thiol compounds having at least two mercapto groups and containing sulfur atoms in addition to the mercapto groups such as bis-, tris- or tetra(mercaptoalkylthio)benzene, bis-, tris- or tetra(mercaptoalkylthio)alkane, bis(mercaptoalkyl) disulfide, hydroxyalkylsulfidebis(mercaptopropionate), hydroxyalkylsulfidebis(mercaptoacetate), mercaptoethyl ether bis(mercaptopropionate), 1,4-dithian-2,5-diolbis(mercaptoacetate), thiodiglycolic acid bis(mercaptoalkyl ester), thiodipropionic acid bis(2-mercaptoalkyl ester), 4,4-thiobutyric acid bis(2-mercaptoalkyl ester), 3,4-thiophenedithiol, bis-muththiol and 2,5-dimercapto-1,3,4-thiadiazol. In a preferred embodiment, the at least one hardener (curing agent) comprises dicyandiamide (DICY).

The weight percent ratio of the compound of Formula (I) to the at least one hardener may vary depending on the type of the specific compound of Formula (I), the at least one hardener employed, and the reaction conditions. In general, the weight ratio of the compound of Formula (I) to the at least one hardener range from 10.0:1.0 to about 2.0:1.0. In various embodiments, the weight ratio of the compound of Formula (I) to the at least one hardener may be from 10.0:1.0 to about 2.0:1.0, from 8.0:1.0 to about 2.5:1.0, 6.0:1.0 to about 3.0:1.0, or 5.0:1.0 to about 4.0:1.0. In one embodiment, the weight ratio of the compound of Formula (I) to the at least one hardener may be about 4.3:1.0.

(c) At Least One Catalyst

The preparation of the curable coating composition may further comprise at least one catalyst, component (c). A wide variety of the at least one catalyst may be used such as boric acid, phosphine compounds selected from triphenylphosphine (TPP), ethyltriphenylphosphonium (ETPPI), tetraphenylphosphonium-tetraphenylborate (TPP-k).

Heterocyclic secondary and tertiary amines or nitrogen-containing catalysts which can be employed herein include, for example, imidazoles, benzimidazoles, imidazolidines, imidazolines, oxazoles, pyrroles, thiazoles, pyridines, pyrazines, morpholines, pyridazines, pyrimidines, pyrrolidines, pyrazoles, quinoxalines, quinazolines, phthalozines, quinolines, purines, indazoles, indoles, indolazines, phenazines, phenarsazines, phenothiazines, pyrrolines, indolines, piperidines, piperazines, and any combination thereof.

Imidazole catalysts include, but are not limited to, for example, 2-methyl imidazole, N-methyl imidazole, 2-ethyl-4-methylimidazole, 2-isopropylimidazole, 1-propylimidazole, 2-heptadecylimidazole, 1-benzyl-2-methyl imidazole, 2-phenyl imidazole (2PI), 1-benzyl-2-phenylimidazole (1B2PZ), 2-heptadecyl imidazole, 2-undecyl imidazole, 2,5-chloro-4-ethyl imidazole, 1,2-dimethylimidazole, imidazole-epoxy adducts, and mixtures thereof.

Pyridine catalysts include, but are not limited to, for example, 4-dimethylamino pyridine, 2-aminopyridine, 3-aminopyridine, 4-aminopyridine, 2,3-diaminopyridine, 2,5-diaminopyridine, 2,6-diaminopyridine, and combinations thereof.

In a preferred embodiment, the at least one catalysts comprises 2-methyl imidazole.

(d) At Least One Optional Solvent

The curable composition may further comprise at least one optional solvent. Suitable solvents useful in the curable composition are detailed above in Section (II)(d). In a preferred embodiment, methyl ethyl ketone may be used as the solvent.

(e) At Least One Optional Additive

The curable composition may further comprise one or more pigments and/or other additives which may be useful for the preparation, storage, application, and curing of the curable compositions. Suitable additives include fillers, leveling assistants, and the like, or combinations thereof. These optional compounds may include compounds that are normally used in resin formulations known to those skilled in the art for preparing curable compositions and thermosets. In general, the amount of these optional additives included in the curable composition may range from about 0 weight % to about 50 weight % based on the total weight of composition. In certain embodiments, the amount of pigment and/or additives may range from about 0 weight % to about 50 weight %, from about 10 weight % to about 40 weight %, or from about 25 weight % to about 35 weight %.

(f) Reaction Conditions

The process to prepare the curable composition may be prepared by forming a reaction mixture comprising the compound of Formula (I), at least one hardener, at least one optional solvent, and at least one optional additive. These components may be added all at the same time, sequentially, or in any order. The curable composition may be achieved by blending the above components in any known mixing equipment or reaction vessel until the mixture achieves homogeneity.

In general, the reaction for preparing the curable composition may be conducted at a temperature that ranges from about 10° C. to about 200° C. In various embodiments, the temperature of the reaction may range from about 10° C. to about 200° C., from about 20° C. to about 180° C., or from about 50° C. to about 160° C. The reaction typically is performed under ambient pressure. The reaction may also be conducted under an inert atmosphere, for example under nitrogen, argon or helium.

The duration of the reaction can and will vary depending on many factors, such as the temperature, the method of mixing, and amount of materials being mixed. The duration of the reaction may range from about 5 minutes to about 12 hours. In some embodiments, the duration of the reaction may range from about 5 minutes to about 30 minutes, from about 30 minutes to about 2 hours, from about 2 hours to about 4 hours, from about 4 hours to about 10 hours, or from about 10 hours to about 12 hours.

(IV) Process for Curing the Curable Composition and Properties of the Cured Composition Another aspect of the present disclosure provides processes for curing the curable composition and properties of the cured composition. The processes comprise providing a curable composition, which is detailed above in section (III), coating the curable composition on a substrate or building a matrix comprising multiple layers of semi-solid or solid prepregs, and then curing the composition.

Generally, the curable composition is applied to at least a portion of a surface of a substrate to be coated, prior to the curing.

(a) Providing a Curable Coating Composition

Suitable curable compositions are described above in section (III).

(b) Substrates

The curable composition may be coated on a substrate. The substrate, in broad terms, may be defined as a material wherein the curable composition is initially applied and adheres to at least a portion of at least one surface of the substrate. The substrate may be any material that can withstand the curing to form a cured coating.

In various embodiments, the substrate is a metal. The substrate, as defined herein, may be a single metal or an alloy of various metals. Non-limiting examples of these metals include cast iron, aluminum, tin, brass, steel, copper, zinc aluminum alloy, nickel, or combinations thereof.

In an alternate embodiment, the substrate may be a fiber. Non-limiting examples of fibers may be glass fibers, carbon fibers, cloth fibers, or combinations thereof. These fibers may be in the form of a fabric such as carbon fiber fabric, glass fiber fabric, or carbon fiber fabric.

In other embodiments, the substrate is a cellulose product. Non-limiting examples of cellulose products may be paper, paperboard, paper cardstock, cardboard, wood, and balsawood.

In still another embodiment, the substrate may be a plastic. Non-limiting examples of plastics may be bakelite, polyester, polyethylene terephthalate, polyethylene, high density polyethylene, polyvinyl chloride, polyvinylidene chloride, polypropylene, polystyrene, polyamides (Nylon), acrylonitrile butadiene styrene, polycarbonates, polyurethanes, and combinations thereof.

In still another embodiment, the article may be a structural laminate or a composite. Non-limiting examples of structural laminates or composites may be laminate floor, carbon fiber laminates, glass fiber laminates, carbon fiber composites, fiber composites, polymer matrix composites, metal matrix composites, and ceramic matrix composites.

In various embodiments, the article may be in various configurations. Non-limiting configuration examples of the substrate may be a coil, a plate, a sheet, a wire, a tube, a fabric, or a pipe. The configuration of the article may be of various dimensions, shapes, thicknesses, and weights.

The liquid curable coating composition may be applied to at least a portion of at least one surface of the substrate, all of a single surface of the article, on multiple surfaces or sides of the substrate, over two surfaces of the substrate, or over every surface of the substrate. Generally, the curable composition may be applied and cured on one layer or multiple layers forming a multi-layered structure or a matrix. In some embodiments, the curable composition may be applied and cured directly on the substrate.

The semi-solid or solid curable coating composition (prepregs) may be cut into various sizes or dimensions. Layering these prepregs then curing would provide a multi-layer structure or a matrix.

As appreciated by the skilled artisan, the cured coating composition may be comprised of a liquid curable coating composition, the semi-solid or solid curable coating composition, or combinations thereof.

(c) Applying the Curable Composition

The process further comprises applying the curable composition to a portion of at least one surface of a substrate. Suitable substrates are detailed above. Application of the curable composition may be applied through various means. For example, the liquid curable composition may be applied using a drawdown bar, a roller, a knife, a paint brush, a sprayer, dipping, or other methods known to the skilled artisan. The semi-solid or solid curable coating composition (prepregs) may be cut into various sizes or dimensions and placed on the substrate. Also, more than one application of the curable composition may be applied forming a multi-layered coating. As detailed above, the curable composition may be applied to one or more surfaces of the substrate to be coated.

(d) Curing the Curable Composition

Generally, the curable composition may be cured in numerous methods known to the skilled artisan. Non-limiting methods for curing the composition may be thermally, free radical initiation, UV light, or combinations thereof. In one preferred embodiment, the curable composition is cured thermally.

The process further comprises heating the curable coating composition to a temperature from about 100° C. to 300° C. to form the cured composition. In one embodiment, the curable composition of present invention can be cured to form a thermoset or cured composition. For example, the curable of the present invention can be cured under conventional processing conditions to form a film, a coating, or a solid. Curing the curable composition may be carried out at curing reaction conditions including a predetermined temperature and for a predetermined period of time sufficient to cure the composition. Generally, curable composition may be heated to a temperature from about 100° C. to about 300° C. to form the cured coating. In various embodiments, the curable composition may be heated to a temperature from about 100° C. to about 200° C., from about 100° C. to about 150° C., from about 150° C. to about 200° C., or from about 125° C. to about 175° C. In some embodiments, the curing temperature may be about 150° C. Methods for heating the substrate may be by a conventional manner or by a method known by one skilled in the art.

The pressure needed in curing the curable coating composition may range from about 1 kg/cm$^2$ to about 50 kg/cm$^2$. In various embodiments, the pressure of forming the cured composition may range from about 1 kg/cm$^2$ to about 50 kg/cm$^2$, from about 5 kg/cm$^2$ to about 40 kg/cm$^2$, from about 15 kg/cm$^2$ to about 35 kg/cm$^2$ or from about 20 kg/cm$^2$ to about 30 kg/cm$^2$.

Generally, the duration of heating step may be from 5 minute to 2 hours. In various embodiments, the duration of heating step may be from about 5 minutes to 2 hours, from about 15 minutes to 1.5 hours, or from about 30 minutes to 1 hour. In a specific embodiment, the duration of the heating step may be about 30 minutes.

(e) Properties of the Cured Composition

The cured composition exhibits low flammability, low toxicity, good processing properties, and good compatibility with a variety of materials.

Generally, the cured composition may exhibit a $T_g$ (Glass Transition Temperature) that is greater than 180° C. which demonstrates greater thermal resistance. The introduction of the oxazolidone contributes to improving the $T_g$. In various embodiments, the cured composition may exhibit at $T_g$ greater than 180° C., greater than 190° C., greater than 195° C., greater than 200° C., or greater than 210° C. In certain embodiments, the cured composition may exhibit a $T_g$ from 190° C. to about 205° C. In another embodiment, the cured composition has a $T_g$ of at least 180° C., as measured using differential scanning calorimetry, or a combination thereof.

Another important property is $T_{total}$. In general, the cured composition exhibits a $T_{total}$ of less than 10 seconds. In various embodiments, the cured composition exhibits a $T_{total}$ of less than 10 seconds, less than 9 seconds, less than 8 seconds, less than 7 seconds, less than 6 seconds, less than 5 seconds, less than 4 seconds, or less than 3 seconds.

Another property is $T_{max}$. Generally, $T_{max}$ of cured composition is less than 4 seconds. In various embodiments, $T_{max}$ of cured composition is less than 4 seconds, less than 3 seconds, or less than 2 seconds.

Dielectric properties of the cured composition are also important property for electric devices. By lowering the secondary alcohol content before curing, the $D_k$(1 MHz) is lowered. Generally, the cured composition has a $D_k$ (1 MHz) of less than 4.8. In various embodiments, the cured composition has a $D_k$ (1 MHz) of less than 4.8, less than 4.7, less than 4.65, or less than 4.6.

The cured composition has a $D_f$(1 MHz) of less than 0.02. In various embodiments, the cured composition has a $D_f$(1 MHz) of less than 0.02, less than 0.0175, less than 0.015, or less than 0.013.

The cured compositions may further exhibit flame retardancy, as measured according to UL94, of V-0. Maintaining the high phosphorus content improves the flame retardancy and $T_g$.

DEFINITIONS

When introducing elements of the embodiments described herein, the articles "a", "an", "the" and "said" are intended to mean that there are one or more of the elements. The terms "comprising", "including" and "having" are intended to be inclusive and mean that there may be additional elements other than the listed elements.

The "glass transition temperature" is the temperature at which a polymer transitions from a hard, glassy material to a soft, rubbery material.

The term "acyloxy," as used herein alone or as part of another group, denotes an acyl group as described above bonded through an oxygen linkage (O), e.g., RC(O)O— wherein R is as defined in connection with the term "acyl."

The term "alkyl" as used herein describes saturated hydrocarbyl groups that contain from 1 to 30 carbon atoms. They may be linear or branched, and may be substituted as defined below. Examples of alkyl groups include methyl, ethyl, propyl, isopropyl, n-butyl, sec-butyl, tert-butyl, isobutyl, hexyl, heptyl, octyl, nonyl, and the like.

The term "cycloalkyl" refers to a saturated, cyclic hydrocarbyl group, containing from 3 to 14 carbon atoms. Cycloalkyl groups are contain one ring or more than one ring, wherein each ring is independently unsubstituted or substituted as described herein.

The term "alkoxide" or "alkoxy" as used herein is a —O-alkyl group, where the alkyl group is unsubstituted or substituted, as described herein.

The term "aromatic" as used herein alone or as part of another group denotes optionally substituted homo- or heterocyclic conjugated planar ring or ring system comprising delocalized electrons. These aromatic groups are preferably monocyclic (e.g., furan or benzene), bicyclic, or tricyclic groups containing from 5 to 14 atoms in the ring portion. The term "aromatic" encompasses "aryl" groups defined below.

The term "aryl" as used herein alone or as part of another group denotes an optionally substituted aromatic hydrocarbyl group, preferably monocyclic or bicyclic hydrocarbyl groups containing from 6 to 10 carbons in the ring portion. Examples of aryl groups include phenyl, biphenyl, and naphthyl, each of which may be unsubstituted or substituted.

The term "heterocyclo" refers to heteroaryl and heterocycloalkyl moieties, which contain at least one non-carbon. Heteroaryl groups are aromatic, while heterocycloalkyl groups are not. Examples of non-carbon groups include nitrogen, oxygen, phosphorous, and boron. Examples of heteroaryl groups include pyridyl, quinolinyl, furyl and thionyl. Examples of heterocycloalkyl moieties include piperidinyl, piperazinyl, morpholinyl and pyrrolidinyl.

The terms "hydrocarbon" and "hydrocarbyl" as used herein describe organic compounds or radicals consisting exclusively of the elements carbon and hydrogen. These moieties include alkyl, cycloalkyl, alkenyl, alkynyl, and aryl moieties. These moieties also include alkyl, alkenyl, alkynyl, and aryl moieties substituted with other hydrocarbon groups, such as alkaryl (e.g., benzyl or phenethyl), alkenaryl and alkynaryl. They may be straight, branched, or cyclic. Unless otherwise indicated, these moieties preferably comprise 1 to 20 carbon atoms.

"Substituted hydrocarbyl" groups are hydrocarbyl groups substituted with at least one moiety that is not a carbon or a hydrogen. These substituents include boron, $C_1$-$C_6$ alkoxy, $C_1$-$C_6$ acyl, $C_1$-$C_6$ acyloxy, $C_2$-$C_6$ alkenoxy, aryloxy, amino, mono $C_1$-$C_6$ alkylamino, di $C_1$-$C_6$ alkylamino, amido, acetal, carbamyl, cyano, halogen, heterocyclo, hydroxyl, keto, ketal, phospho, nitro, and thiol.

Having described the invention in detail, it will be apparent that modifications and variations are possible without departing from the scope of the invention defined in the appended claims.

EXAMPLES

The following examples illustrate various embodiments of the invention.
The following components were used:

| | |
|---|---|
| MDI1 | MDI1 is 4,4'-diphenylmethane diisocyanate, the functionality 2.7 under trade name of Lupranat ® M20S sold and manufactured by BASF Co., Ltd., Germany. |
| MDI2 | MDI2 is a blend of 4,4'-, 2,4' and 2,2'-diphenylmethane diisocyanate M, the functionality 2.0 under trade name of Desmodur TP PU 0129 sold and manufactured by Covestro Co., Ltd., Germany. |
| MDI3 | MDI 3 is carbodiimide-uretonimine-modified 4,4'-diphenylmethane diisocyanate, functionality 2.2 under trade name of WANNATE MDI-100LL sold and manufactured by Wanhua Chemical Co., Ltd., China. |
| Epoxy Resin 1 | An epoxy having an epoxy equivalent weight of 182-192 grams/equivalent, a hydrolyzable chloride of below 200 ppm, a viscosity of 11000-15000 cp under trade name of BE188EL sold and manufactured by Chang Chun Plastic Co., Ltd., Taiwan, R.O.C. |
| Epoxy Resin 2 | An epoxy having an epoxy equivalent weight of 300-350 grams/equivalent, a solid content of 70%, phosphorus content 3.2-3.4% content under trade name of BEP360M70 sold and manufactured by Chang Chun Plastic Co., Ltd., Taiwan, R.O.C. |
| Epoxy Resin 3 | An epoxy having an epoxy equivalent weight of 350-400 grams/equivalent, a solid content of 70%, phosphorus content 3.2-3.4% content under trade name of BEP330A70 sold and manufactured by Chang Chun Plastic Co., Ltd., Taiwan, R.O.C. |
| Curing agent A | Dicyandiamide (DICY), 10% dissolved in dimethylformamide |
| Catalyst A | 2-Ethyl-4-methyl imidazole (2E4MZ), 10% dissolved in methanol. |
| Catalyst B | 2-Methylimidazole (hereinafter referred to 2MI), 10% dissolved in methanol. |

Example 1

Synthesis of Phosphorus Containing Bisphenol Compound A1 (DMP)

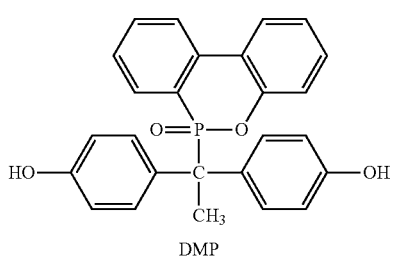 [SMILES: CC(c1ccc(O)cc1)(c1ccc(O)cc1)P1(=O)Oc2ccccc2-c2ccccc21]

DMP 10.81 g (0.05 mole) of 9,10-dihydro-9-oxa-10-phosphaphenanthrene-10-oxide (DOPO), 23.5 g (0.25 mole) of phenol, 6.81 g (0.05 mole) of 4'-hydroxyacetophenone, and 0.432 g (4 wt % based on the weight of DOPO) of p-toluenesulfonic acid were mixed and stirred in a 250 ml three-necked flask reactor at room temperature in advance. The reactants were stirred constantly at 130° C. for 24 hours to form a mixture, and then the temperature of the mixture was cooled down to the room temperature. The crude products separated out from the cooled mixture were washed by ethanol and then filtrated and dried. The phosphorus-containing bisphenol product A1 (DMP), was obtained as a white powder.

The yield of the foregoing phosphorus-containing bisphenol was 85%, and the melting point was 306° C. The measured value of the carbon, hydrogen, and oxygen element were 72.48%, 4.65%, and 14.90%, respectively (the theoretical value, C, 72.89%; H, 4.65%; O, 14.94%.) by elemental analysis.

Example 2

Synthesis of Phosphorus-Containing Bisphenol Epoxy 81 (DMPE)

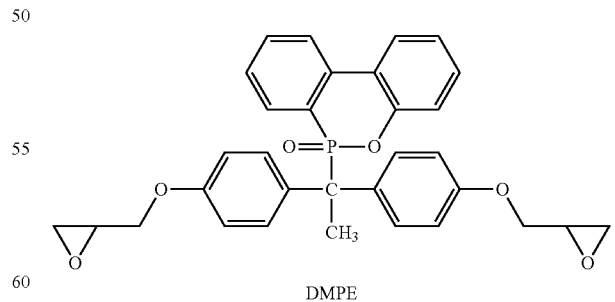

DMPE 214 g (0.4 mole) of DMP (phosphorus-containing bisphenol compound A1) and 925 g (1.0 mole) of epichlorohydrin were placed in a five-neck glass reaction kettle equipped with an electric heating jacket, a temperature controller, an electric stirrer and a stirring bar, a nitrogen gas inlet, a thermocouple, a water-cooled condenser, and a feeding funnel. Nitrogen gas was introduced and the reaction kettle was heated to 130° C. After the DMP completely melted, temperature of the reaction kettle was decreased to 70° C. and then 200 g of 20% aqueous sodium hydroxide solution was added into the homogeneous solution at a constant rate over 4 hours and the water contained in the reaction system was azeotropically distilled at the same time under absolute pressure of 190 mm Hg. After the reaction had completed, the remaining epichlorohydrin and solvent were removed by vacuum distillation. Sodium chloride contained in the resulting crude epoxy resin was dissolved in methyl ethyl ketone and deionized water and removed with a water wash. The solvent was distillated from the resulting crude epoxy resin under reduced pressure to yield a light-yellow epoxy resin with 290 equivalents of epoxy, and the theoretical phosphorus content was 5.75 wt %. For uniformity, the product was dissolved in the methyl ethyl ketone (MEK) and the solid content adjusted to 75%.

Example 3

Synthesis of Curable Compounds of Formula (I)

is 0 and n is 0, $R_5$ is methyl, $R_1$, $R_2$, $R_3$, and $R_4$ are H) was placed in a five-neck glass reaction kettle equipped with an electric heating jacket, a temperature controller, an electric stirrer and a stirring bar, a nitrogen gas inlet, a thermocouple, a water-cooled condenser, and a feeding funnel. The reaction kettle was heated to 130° C. under a nitrogen atmosphere. After the DMPE was completely melted and dried under vacuum, 0.5g of catalyst A was introduced under a nitrogen atmosphere. After the temperature was raised to 150° C., 7.9g of MDI1 (used as Formula (III), wherein A is formula (XVII) wherein m is 0) was added into the reaction. The temperature was elevated to 165° C. and the reaction was stirred for 1 hr. The product (Example 3), (used as Formula (I), wherein b is 0-5, $Ar_1$ and $Ar_2$ are formula (XIII) wherein m is 0 and n is 0, $R_5$ is methyl, $R_1$, $R_2$, $R_3$, and $R_4$ are H)) formed. For uniformity, the product was dissolved in the methyl ethyl ketone (MEK) and the solid content was adjusted to 70%.

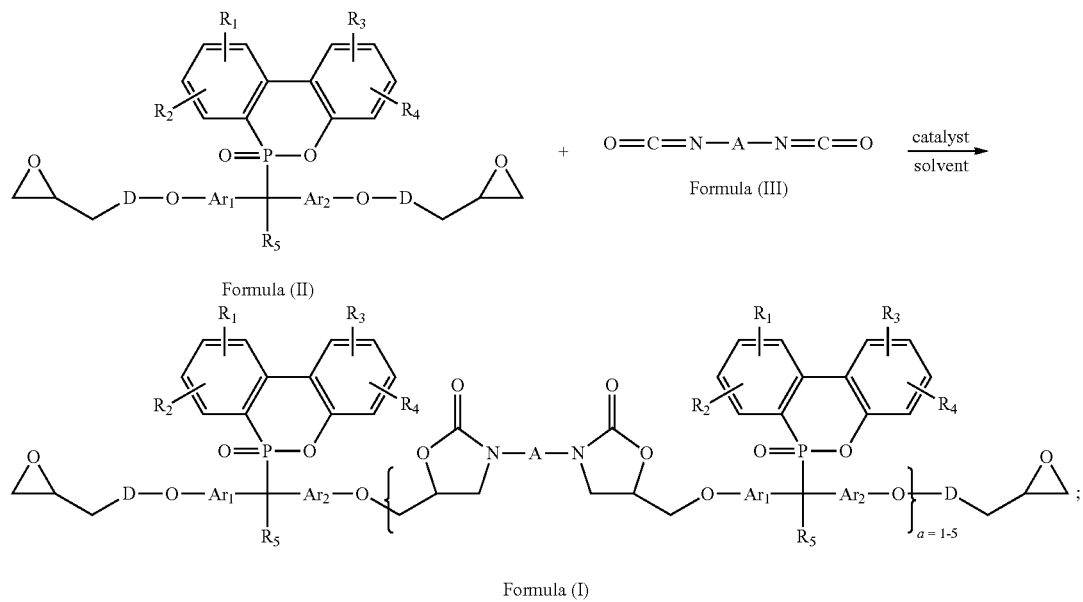

wherein

Formula (IV)

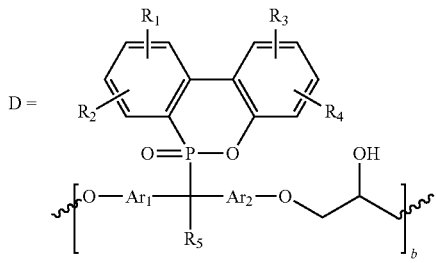

100 g of DMPE (Example 2), (used as Formula(II), wherein b is 0-5, $Ar_1$ and $Ar_2$ are formula (XIII) wherein m Example 4

Synthesis of Curable Compounds of Formula (I)

Example 4 was prepared using the same procedure as for Example 3. In this example, the diisocyanate utilized was MDI2.

Example 5

Synthesis of Curable Compounds of Formula (I)

Example 5 was prepared using the same procedure as for Example 3. In this example, the diisocyanate utilized was MDI3 (used as Formula (III)), wherein A is formula (XX).

Comparative Example 1

Synthesis of Curable Compounds 63.3 g of Example 1 and 100 g epoxy resin1 were placed in a five-neck glass reaction kettle equipped with an electric heating jacket, a temperature controller, an electric stirrer and a stirring bar, a nitrogen gas inlet, a thermocouple, a water-cooled condenser, and a feeding funnel. The reaction kettle was heated to 130° C. under a nitrogen atmosphere. After the Example 1 and epoxy resin1 completely melted and dried under vacuum, 0.7 g of catalyst A was introduced under a nitrogen atmosphere. The temperature was raised to 170° C. and maintained for 2.5 hr. The product (Comparative Example 1), formed. For uniformity, the product was dissolved in the methyl ethyl ketone (MEK) and the solid content was adjusted to 65%.

Comparative Example 2

Synthesis of Curable Compounds

Comparative Example 2 was prepared using the same procedure as for Example 3. In this example, epoxy resin 2 was substituted for DMPE and no MDI was used.

Comparative Example 3

Synthesis of Curable Compounds

The Comparative Example 3 was prepared in the same procedure as that of example 3. In this example, epoxy resin 2 was substituted for DMPE and 5 g of MDI2 was used.

Comparative Example 4

Synthesis of Curable Compounds

The Comparative Example 4 was prepared in the same procedure as that of example 3. In this example, epoxy resin 3 was substituted for DMPE and no MDI was used.

The following testing procedures were conducted:

Epoxy equivalent weight (EEW): the epoxy resin was determined according to the method in ASTM D1652.

Solid content: 1 gram of sample containing the phosphorus-containing epoxy resin was placed in an oven at 150° C. for 60 minutes after which and the weight percentage of the resulting non-volatile components was measured.

Phosphorus content: A standard curve of UV-Vis absorption at 420 nm was prepared from a set of potassium dihydrogen phosphate solutions at various concentrations. Sulfuric acid and potassium persulfate were added into epoxy resin samples. Following a digestion process carried out under a temperature of 100° C. for 60 minutes, the digested sample solutions were treated with molybdovanadate reagent to form vanadomolybdophosphoric acid. The samples were measured by UV-Vis absorption at 420 nm. The phosphorus content was determined from the standard curve in mass %.

Oxazolidone content (eq/kg): The oxazolidone ring structure was synthezied from epoxies and isocyanates. Consequently, oxazolidone content was obtained from the consumed amount of epoxy. As shown in the following formula, Oxazolidone content=((Resin Weight/$EEW_0$)−(Product Weight/$EEW_1$))/(Product Weight)×1000 where $EEW_0$ is the epoxy equivalent value of the epoxy reactant and $EEW_1$ is the epoxy equivalent value of the product.

Table 1 shows the inventive examples. Table 2 shows the comparative examples.

TABLE 1

| | | Inventive Examples | | |
|---|---|---|---|---|
| | Component | Example 3 | Example 4 | Example 5 |
| Epoxy Resins | Synthesis Example A1 (DMP) | | | |
| | Synthesis Example B1 (DMPE) | 100 | 100 | 100 |
| | Epoxy Resin 1 (BE188EL) | | | |
| | Epoxy Resin 2 (BEP360M70) | | | |
| | Epoxy Resin 3 (BEP330A70) | | | |
| Diisocyanate | MDI1 (BASF Lupranat M20S) | 7.9 | | |
| | MDI 2 (Covestro TP PU 0129M) | | 7.9 | |
| | MDI 3 (WANNATE MDI-100LL) | | | 7.9 |
| Catalyst | Catalyst A (2E4MZ) | 0.5 | 0.5 | 0.5 |
| Solvent | MEK | 46.7 | 46.7 | 46.7 |
| Properties of Curable Resin Product | EEW [g/eq] | 378 | 384 | 372 |
| | Solid content (%) | 70% | 70% | 70% |
| | Resin (g) | 108.4 | 108.4 | 108.4 |
| | Phosphorus Content [wt %] | 5.31% | 5.31% | 5.31% |
| | Oxazolidone Content [eq/kg] | 0.54 | 0.58 | 0.49 |

TABLE 2

| | | Comparative Example | | | |
|---|---|---|---|---|---|
| | Component | Comparative Example 1 | Comparative Example 2 | Comparative Example 3 | Comparative Example 4 |
| Epoxy Resins | Synthesis Example A1 (DMP) | 63.3 | | | |
| | Synthesis Example B1 (DMPE) | | | | |
| | Epoxy Resin 1 (BE188EL) | 100 | | | |
| | Epoxy Resin 2 (BEP360M70) | | 100 | 100 | |
| | Epoxy Resin 3 (BEP330A70) | | | | 100 |

TABLE 2-continued

| | | Comparative Example | | | |
|---|---|---|---|---|---|
| | Component | Comparative Example 1 | Comparative Example 2 | Comparative Example 3 | Comparative Example 4 |
| Diisocyanate | MDI1 (BASF Lupranat M20S) | | | | |
| | MDI 2 (Covestro TP PU 0129M) | | | 5 | |
| | MDI 3 (WANNATE MDI-100LL) | | | | |
| Catalyst | Catalyst A (2E4MZ) | 0.7 | | 0.5 | |
| Solvent | MEK | 90 | | 45 | |
| Properties of Curable Resin Product | EEW [g/eq] | 660 | 310 | 373 | 360 |
| | Solid content (%) | 65% | 70% | 70% | 70% |
| | Resin (g) | 164.0 | 100.0 | 105.5 | 100.0 |
| | Phosphorus Content [wt %] | 2.80% | 3.30% | 3.13% | 3.30% |
| | Oxazolidone Content [eq/kg] | 0.00 | 0.00 | 0.38 | 0.00 |

Example 6

Curing the Curable Compounds of Formula (I)

Glass fiber fabric (GF-7628) was impregnated with the phosphorus-containing epoxy resins from Examples 3 to Comparative Example 4 and dried at 160° C. to form prepegs. Five pieces of the prepregs were layered and a sheet of 35 μm copper foil was placed on the top and bottom. This structure was laminated at 210° C. under a pressure of 25 kg/cm². This resulting laminated entity contains the phosphorus-containing epoxy resin and glass fiber fabric. The physical properties of each laminated entity were analyzed according to the following procedures. Table 3 shows the inventive examples. Table 4 shows the comparative examples.

Dielectric Constant ($D_k$) and Dissipation Factor ($D_f$) were measured according to IPC-TM-650-2.5.5.9.

Peel Strength (1 oz copper) was measured according to IPC-TM-650-2.4.8.

Glass Transition Temperature ($T_g$) was measured according to IPC-TM-650-2.4.25 by using Differential Scanning calorimetry (DSC) (Scan Rate: 20° C./min.).

Glass Transition Temperature ($T_g$) was measured according to IPC-TM-650-2.44.4 by using Dynamic mechanical analysis (DMA) (Scan Rate: 2° C./min).

Coefficient Thermal Expansion (CTE, ppm/K) was measured according to IPC-TM-650-2.4.24 by TMA (thermomechanical analysis) ($\alpha 1$ is the CTE value before $T_g$, $\alpha 2$ is the CTE value after $T_g$).

Decomposition Temperature (Td, 5% weight loss) was measured according to IPC-TM-650-2.3.40 using a thermogravimetric analyzer (TGA) (Scan Rate: 10° C./min).

Water Absorption (Wt %): To calculate the water absorption, the specimens were placed in 100° C. water and the increase in weight (wt %) measured after two hours.

Thermal Stability (S-288) were measured according to JIS-C-6481: The laminated entity was immersed into a 288° C. solder furnace and the time to delamination measured.

Flame Retardancy was measured according to UL94.

| UL 94 Flammability Ratings Summary | |
|---|---|
| 5VA Surface Burn | Burning stops within 60 seconds after five applications of five seconds each of a flame (larger than that used in Vertical Burn testing) to a test bar. Test specimens MAY NOT have a burn-through (no hole). This is the highest (most flame retardant) UL94 rating. |
| 5VB Surface Burn | Burning stops within 60 seconds after five applications of five seconds each of a flame (larger than that used in Vertical Burn testing) to a test bar. Test specimens MAY HAVE a burn-through (a hole). |
| V-0 Vertical Burn | Burning stops within 10 seconds after two applications of ten seconds each of a flame to a test bar. NO flaming drips are allowed. |
| V-1 Vertical Burn | Burning stops within 60 seconds after two applications of ten seconds each of a flame to a test bar. NO flaming drips are allowed. |
| V-2 Vertical Burn | Burning stops within 60 seconds after two applications of ten seconds each of a flame to a test bar. Flaming drips ARE allowed. |
| H-B Horizontal Burn | Slow horizontal burning on a 3 mm thick specimen with a burning rate is less than 3"/min or stops burning before the 5" mark. H-B rated materials are considered "self-extinguishing". This is the lowest (least flame retardant) UL94 rating. |

TABLE 3

| | Inventive Examples | | | |
|---|---|---|---|---|
| Composition Example (CCL) | | Example 6 | Example 7 | Example 8 |
| Resin | EEW [g/eq] | 378 | 384 | 372 |
| | P-content in Epoxy Resin [wt %] | 5.31% | 5.31% | 5.31% |
| | Varnish P-content [wt %] | 5.14% | 5.14% | 5.14% |
| | Oxazolidone content [eq/kg] | 0.54 | 0.58 | 0.49 |

TABLE 3-continued

Inventive Examples

| | Composition Example (CCL) | Example 6 | Example 7 | Example 8 |
|---|---|---|---|---|
| Composition | Synthesis Example from | Example 3 | Example 4 | Example 5 |
| | Synthesis Example B1 (Example 2) | 100 | 100 | 100 |
| | Synthesis Example 3 | 100 | | |
| | Synthesis Example 4 | | 100 | |
| | Synthesis Example 5 | | | 100 |
| | Curing Agent (DICY: Dicyanamide) | 23 | 22.6 | 23.3 |
| | Catalyst (2MI: 2-methyl imidazole) | 0.2 | 0.2 | 0.2 |
| | Acetone | 5 | 5 | 5 |
| Form | Curing Agent | DICY | DICY | DICY |
| | Board Thickness [mm] | 1.02 | 0.93 | 1.16 |
| Thermal Properties | Flammability | V0 | V0 | V0 |
| | Flammability $T_{total}/T_{max}$ (sec) | 3.5/1.9 | 6.3/2.2 | 8.9/3.2 |
| | $T_g$ [° C.](DSC) | 201.0 | 195.0 | 197.0 |
| | $T_g$ [° C.] (DMA) | 201.0 | 200.5 | 201.0 |
| | Solder Float 288° C. [sec] | >180 | >180 | >180 |
| | CTE Pre-$T_g$ [ppm/° C.] | 19.3 | 25.1 | 26.8 |
| | CTE Post $T_g$ [ppm/° C.] | 209.0 | 224.0 | 225.7 |
| Mechanical Properties | Peel Strength [kgf/cm] (1 oz Cu) | 1.8 | 1.9 | 1.7 |
| | Water Absorption (wt %) | 0.43 | 0.37 | 0.45 |
| Dielectric Properties | $D_k$ (1 Mz) | 4.54 | 4.53 | 4.58 |
| | $D_f$ (1 Mz) | 0.013 | 0.012 | 0.013 |

TABLE 4

Comparative Examples

| | Composition Example (CCL) | Comparative Example 5 | Comparative Example 6 | Comparative Example 7 | Comparative Example 8 |
|---|---|---|---|---|---|
| Resin | EEW [g/eq] | 660 | 310 | 373 | 360 |
| | P-content in Epoxy Resin [wt %] | 2.80% | 3.30% | 3.13% | 3.30% |
| | Varnish P-content [wt %] | 2.75% | 3.17% | 3.03% | 3.19% |
| | Oxazolidone content [eq/kg] | 0.00 | 0.00 | 0.38 | 0.00 |
| Composition | Synthesis Example from | Comparative Example 1 | Comparative Example 2 | Comparative Example 3 | Comparative Example 4 |
| | Synthesis Comparative Example 1 | 100 | | | |
| | Synthesis Comparative Example 2 | | 100 | | |
| | Synthesis Comparative Example 3 | | | 100 | |
| | Synthesis Example B4 (Example 5) | | | | 100 |
| | Curing Agent (DICY: Dicyanamide) | 12.2 | 28 | 23.3 | 24.1 |
| | Catalyst (2MI: 2-methyl imidazole) | 0.3 | 0.2 | 0.2 | 0.2 |
| | Acetone | 5 | 5 | 5 | 5 |
| Form | Curing Agent | DICY | DICY | DICY | DICY |
| | Board Thickness [mm] | 1.05 | 0.96 | 0.96 | 0.95 |
| Thermal Properties | Flammability | V0 | V0 | V0 | V0 |
| | Flammability $T_{total}/T_{max}$ (sec) | 45.3/8.8 | 23.2/5.1 | 45/7 | 22.4/6.3 |
| | $T_g$ [° C.](DSC) | 141.3 | 134.1 | 141.0 | 168.0 |
| | $T_g$ [° C.] (DMA) | 149.5 | 140.5 | 147.4 | 173.5 |
| | Solder Float 288° C. [sec] | >180 | >180 | >180 | >180 |
| | CTE Pre-Tg [ppm/° C.] | 59.6 | 34.0 | 30.0 | 30.2 |

TABLE 4-continued

| | Composition Example (CCL) | Comparative Example 5 | Comparative Example 6 | Comparative Example 7 | Comparative Example 8 |
|---|---|---|---|---|---|
| | CTE Post Tg [ppm/° C.] | 289.9 | 264.3 | 241.0 | 231.5 |
| Mechanical Properties | Peel Strength [kgf/cm] (1 oz Cu) | 2.0 | 1.5 | 1.6 | 1.4 |
| | Water Absorption (wt %) | 0.31 | 0.33 | 0.31 | 0.30 |
| Dielectric Properties | $D_k$ (1 Mz) | 4.90 | 5.16 | 5.22 | 5.76 |
| | $D_f$ (1 Mz) | 0.019 | 0.013 | 0.012 | 0.011 |

According to the inventive examples and comparative examples from tables, the inventive resin shows higher phosphorus content than comparative resins resulted in improved $T_g$ and better flammability on composition. The improved $T_g$ also resulting from the introducing oxazolidone structure into composition.

According to the table 3 and 4, the present invention provides a higher glass transition temperature, wherein greater than 180° C. The present invention also provides the better dielectric properties which the $D_k$ is smaller than 4.58 and $D_f$ is still keep in excellent level. The better dielectric properties are resulting from the decreasing secondary alcohols in structure by modifying the epoxy with MDI. The flammability also show a better results on example than comparative sample basing on the lower $T_{total}$ and $T_{max}$ value.

What is claimed is:

1. A compound of Formula (I):

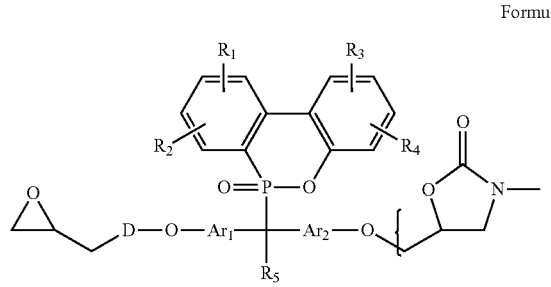

Formula (I)

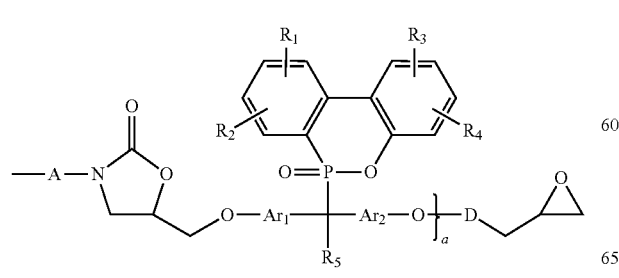

wherein,

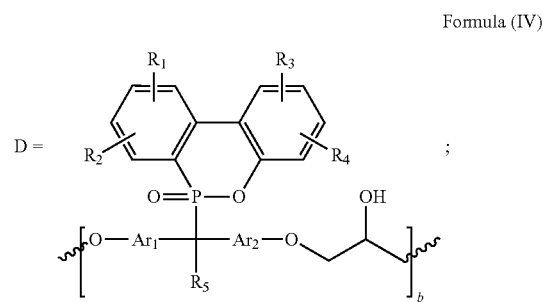

Formula (IV)

$R_1$, $R_2$, $R_3$, and $R_4$ are independently selected at each occurrence from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ ; unsubstituted cycloalkyl, and $C_3$-$C_{10}$ substituted cycloalkyl;

a is an integer between 1 and 5;

b is an integer between 0 and 5;

$R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, $C_3$-$C_{10}$ substituted cycloalkyl, and $Ar_3$; wherein $Ar_3$ is selected from a group consisting of:

Formula (V)

Formula (VI)

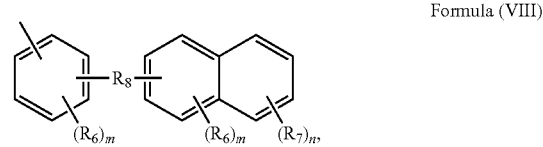

Formula (VIII)

-continued

Formula (IX)
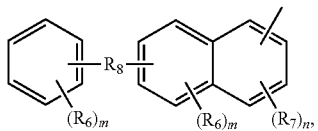

Formula (X)
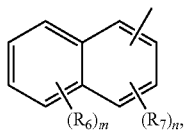

Formula (XI)
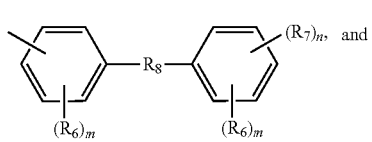

Formula (XII)
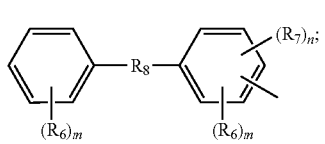

Ar₁ and Ar₂ are independently selected from the group consisting of:

Formula (XII)
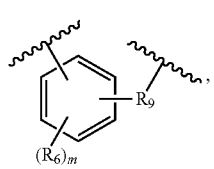

Formula (XIII)
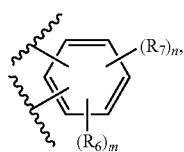

Formula (XIV)
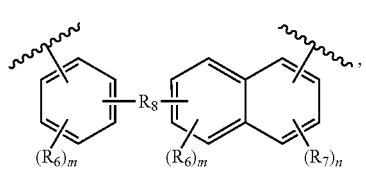

Formula (XV)
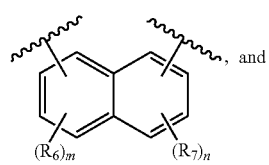

Formula (XVI)
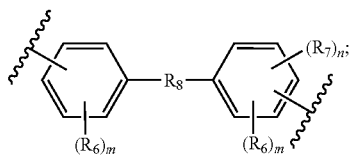

A is selected from the group consisting of:

Formula (XVII)
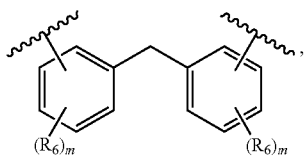

Formula (XVIII)
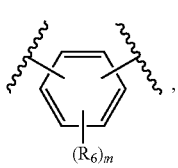

Formula (XIX)
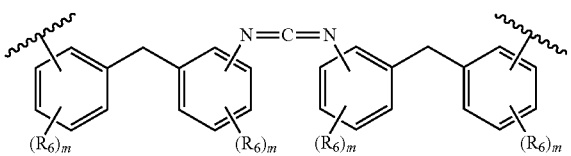

Formula (XX)
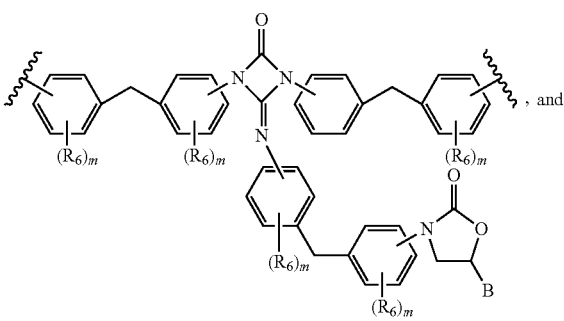

Formula (XXI)
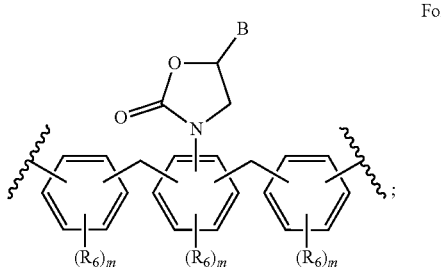

wherein m and n are independent integers from 0 to 4;

Formula (XXII)
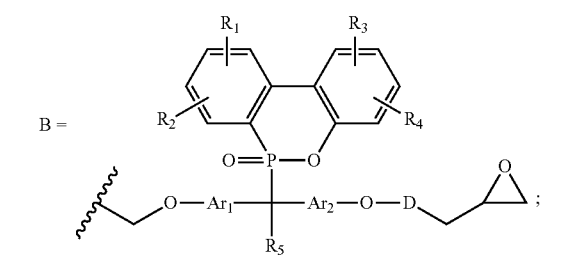

$R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—; and $R_9$ is absent or is —$(CH_2)_p$—, wherein p is an integer from 1 to 20.

2. The compound of claim 1, wherein $R_5$ is $C_1$-$C_6$ unsubstituted alkyl or $C_1$-$C_6$ substituted alkyl.

3. The compound of claim 1, wherein $Ar_1$ and $Ar_2$ are independently:

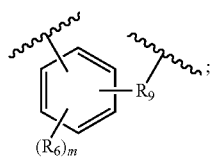

Formula (XII)

wherein $R_6$ is hydrogen or $C_1$-$C_4$ unsubstituted alkyl and $R_9$ is absent or —$(CH_2)_p$—wherein p is an integer from 1 to 4.

4. The compound of claim 3, wherein $R_6$ is hydrogen and $R_9$ is absent.

5. The compound of claim 1, wherein A is:

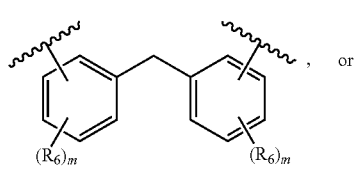

Formula (XVII)

, or

-continued (XVIII)

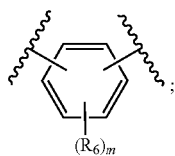

wherein m is an independent integer from 0 to 2; and $R_6$ are independently selected from the group consisting of H, $C_1$-$C_6$ unsubstituted alkyl, and $C_1$-$C_6$ substituted alkyl.

6. The compound of claim 1, wherein $R_1$, $R_2$, $R_3$, and $R_4$ at each occurrence are independently selected from the group consisting of hydrogen, $C_1$-$C_4$ unsubstituted alkyl, and $C_1$-$C_4$ substituted alkyl.

7. The compound of claim 1, wherein phosphorus content is at least 3.5 wt %.

8. The compound of claim 1, wherein an oxazolidone content is at least 0.4 [eq/kg].

9. A cured composition prepared by curing the curable composition comprising:
   a. at least one compound of claim 1;
   b. at least one hardener; and
   c. at least one catalyst.

10. The cured composition of claim 9, wherein the curable composition further comprises at least one solvent, at least one additive or a combination thereof.

11. The cured composition of claim 9, wherein the cured composition has a $T_g$ that is greater than 180° C., as measured using differential scanning calorimetry.

12. A laminate comprising at least one copper foil and at least one cured prepreg, wherein the at least one cured prepreg, prior to being cured, comprises a fiber fabric impregnated with a curable composition; and wherein the curable composition comprises:
   a. at least one compound of claim 1;
   b. at least one hardener; and
   c. at least one catalyst.

13. The laminate of claim 12, wherein a $T_{total}$ of the cured prepreg is less than 10 seconds, and a $T_{max}$ of the cured prepreg is less than 4 seconds, as measured according to UL94.

14. The laminate of claim 12, wherein a Dielectric Constant ($D_k$) of the cured prepreg is less than 4.8 and a Dissipation Factor ($D_f$) of the cured prepreg is less than 0.020, as measured according to IPC-TM-650-2.5.5.9.

15. A method of preparing the compound of Formula (I),

Formula (I)

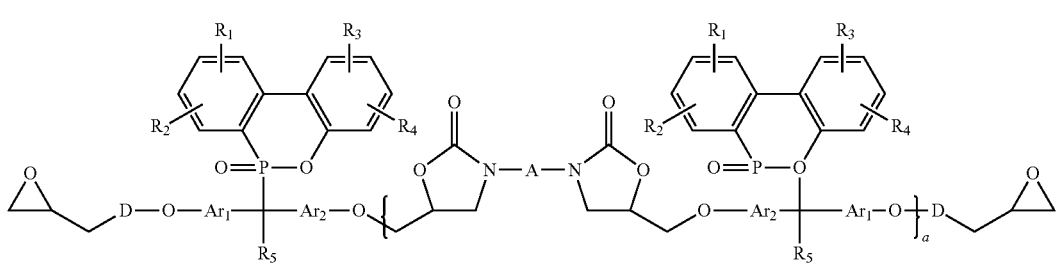

comprising contacting a compound of Formula (II),

Formula (II)

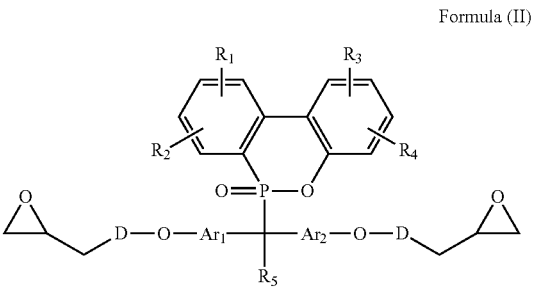

with a compound of Formula (III),

O═C═N—A—N═C═O

Formula (III);
and at least one catalyst;
wherein

D = 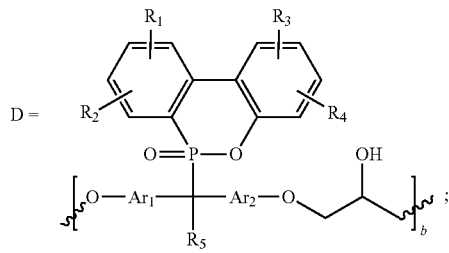

wherein $R_1$, $R_2$, $R_3$, and $R_4$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

a is an integer between 1 and 5;

b is an integer between 0 and 5;

$R_5$ is independently selected from the group consisting of $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl, and $Ar_3$; wherein $Ar_3$ is selected from a group consisting of:

Formula (V)

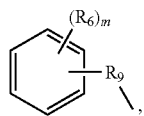

Formula (VI)

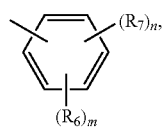

Formula (VIII)

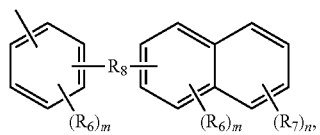

Formula (IX)

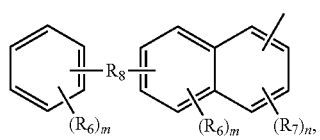

Formula (X)

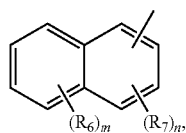

Formula (XI)

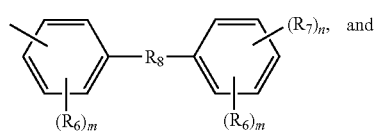

Formula (XII)

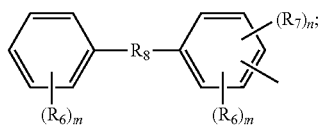

$Ar_1$ and $Ar_2$ are independently selected from the group consisting of:

Formula (XII)

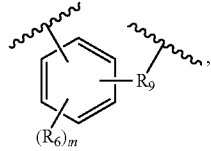

Formula (XIII)

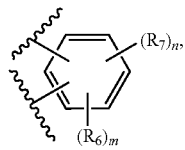

Formula (XIV)

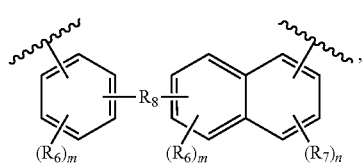

Formula (XV)

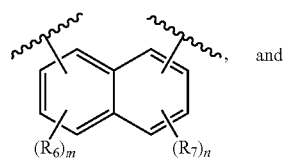

Formula (XVI)

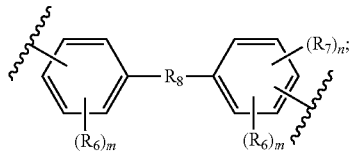

A is selected from the group consisting of:

Formula (XVII)

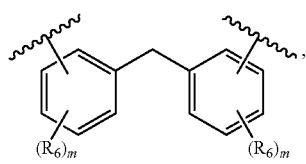

Formula (XVIII)

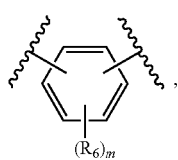

-continued

Formula (XIX)

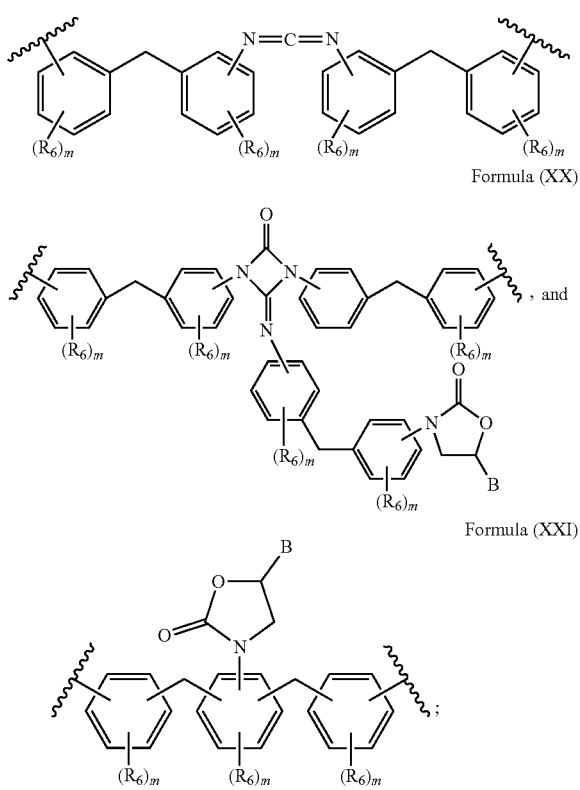

Formula (XX)

Formula (XXI)

m and n are independent integers from 0 to 4;

Formula (XXII)

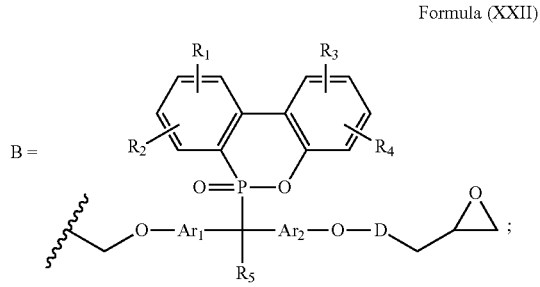

$R_6$ and $R_7$ are independently selected from the group consisting of H, $C_1$-$C_{10}$ unsubstituted alkyl, $C_1$-$C_{10}$ substituted alkyl, $C_1$-$C_{10}$ unsubstituted alkoxy, $C_1$-$C_{10}$ substituted alkoxy, $C_3$-$C_{10}$ unsubstituted cycloalkyl, and $C_3$-$C_{10}$ substituted cycloalkyl;

$R_8$ is absent or is selected from the group consisting of —$CH_2$—, —$(CH_3)_2C$—, —CO—, —$SO_2$—, and —O—;

$R_9$ is absent or is —$(CH_2)_p$—, wherein p is an integer from 1 to 20.

16. The method of claim 15, wherein $R_5$ is $C_1$-$C_6$ unsubstituted alkyl or $C_1$-$C_6$ substituted alkyl.

17. The method of claim 15, wherein $Ar_1$ and $Ar_2$ are independently

Formula (XII)

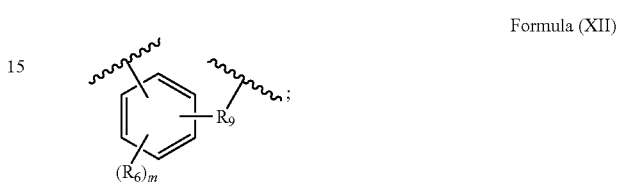

wherein $R_6$ is hydrogen or $C_1$-$C_4$ unsubstituted alkyl and $R_9$ is absent or —$(CH_2)_p$— wherein p is an integer from 1 to 4.

18. The method of claim 15, wherein A is:

Formula (XVII)

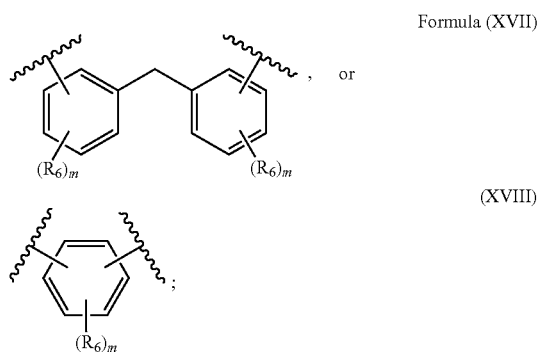

wherein m is an independent integer from 0 to 1; and $R_6$ is H.

19. The method of claim 15, wherein the weight ratio of the compound comprising Formula (II) to the compound comprising Formula (III) may range from about 20.0:1.0 to about 5.0:1.0.

20. The method of claims 15, wherein the at least one catalyst comprises an imidazole and the weight ratio of the phosphorus containing bisphenol compound of Formula (II) to the catalyst may range from 500:1 to 50:1.

* * * * *